US011918138B2

(12) United States Patent
Thompson et al.

(10) Patent No.: US 11,918,138 B2
(45) Date of Patent: Mar. 5, 2024

(54) BEVERAGE VESSEL SUPPORT APPARATUS

(71) Applicant: LAVAZZA PROFESSIONAL UK LIMITED, Basingstoke (GB)

(72) Inventors: Mark Thompson, Ash Aldershot (GB); David Hay, Basingstoke (GB); Stephen Hobden, Winklebury (GB)

(73) Assignee: LUIGI LAVAZZA S.p.A., Turin (IT)

( * ) Notice: Subject to any disclaimer, the term of this patent is extended or adjusted under 35 U.S.C. 154(b) by 489 days.

(21) Appl. No.: 17/268,808

(22) PCT Filed: Aug. 16, 2019

(86) PCT No.: PCT/IB2019/000925
§ 371 (c)(1),
(2) Date: Feb. 16, 2021

(87) PCT Pub. No.: WO2020/035735
PCT Pub. Date: Feb. 20, 2020

(65) Prior Publication Data
US 2021/0169265 A1 Jun. 10, 2021

(30) Foreign Application Priority Data
Aug. 17, 2018 (GB) ..................................... 1813479

(51) Int. Cl.
*A47J 31/44* (2006.01)
*A47J 31/46* (2006.01)
*B67D 1/08* (2006.01)

(52) U.S. Cl.
CPC ....... *A47J 31/4482* (2013.01); *A47J 31/4428* (2013.01); *A47J 31/46* (2013.01); *B67D 1/0891* (2013.01)

(58) Field of Classification Search
CPC .... A47J 31/4482; A47J 31/4428; A47J 31/46; B67D 1/0891
(Continued)

(56) References Cited

U.S. PATENT DOCUMENTS 5,116,004 A * 5/1992 Luecke .................. F16M 11/28
248/188.4
6,648,025 B2 * 11/2003 Smith .................. B67D 1/0007
141/2
(Continued)

FOREIGN PATENT DOCUMENTS

EP 0585607 A1 3/1994
EP 3222175 A1 9/2017
(Continued)

OTHER PUBLICATIONS

International Search Report for Parent Application PCT/IB000925, dated Mar. 25, 2020.
(Continued)

*Primary Examiner* — Timothy L Maust
(74) *Attorney, Agent, or Firm* — The Belles Group, P.C.

(57) ABSTRACT

A beverage dispensing apparatus having a height-adjustable support member for supporting a beverage vessel at a plurality of different support positions. The beverage dispensing apparatus may include a beverage dispensing outlet for dispensing a beverage and a movable support member having a top surface for supporting a beverage vessel below the beverage dispensing outlet. The movable support member may include an inner telescoping element and an outer telescoping element. An actuation assembly may be operably coupled to the movable support member to move the movable support member to modify a distance between the top surface of the movable support member and the beverage dispensing outlet. Activation of the actuation assembly may cause both the inner and outer telescoping elements to move simultaneously either towards or away from the beverage dispensing outlet.

19 Claims, 17 Drawing Sheets

(58) Field of Classification Search
USPC .................................................. 141/270, 275
See application file for complete search history.

(56) References Cited

U.S. PATENT DOCUMENTS

| | | | |
|---|---|---|---|
| 9,675,205 B2* | 6/2017 | Cahen | F16M 13/022 |
| 11,470,996 B2* | 10/2022 | Epars | A47J 31/3676 |
| 2010/0159097 A1 | 6/2010 | Boussemart et al. | |

FOREIGN PATENT DOCUMENTS

| | | |
|---|---|---|
| EP | 3275348 | 1/2018 |
| JP | 2001-270598 A | 10/2001 |
| JP | 2007-128379 A | 5/2007 |
| KR | 20100061110 A | 6/2010 |
| WO | WO 2016/177417 A1 | 11/2016 |

OTHER PUBLICATIONS

United Kingdom Search Report for Priority Application No. 1813479. 1, dated Feb. 4, 2019.

* cited by examiner

BEVERAGE VESSEL SUPPORT APPARATUS

CROSS-REFERENCE TO RELATED APPLICATIONS

The present application claims priority to United Kingdom Patent Application No. 1813479.1, filed on Aug. 17, 2018, the entirety of which is incorporated herein by reference.

FIELD

This disclosure relates to beverage vessel support apparatus. More particularly, the disclosure relates to height-adjustable beverage vessel support apparatus for a beverage dispensing machine.

BACKGROUND

In beverage dispensing apparatus, it is desirable to position a beverage vessel such that the rim of the vessel is as close as possible to the beverage dispensing outlet to thereby reduce spillage and waste of beverage. It is known to provide a beverage vessel support which is height-adjustable to thereby allow the support's position to be adjusted to ensure that the beverage vessel rim is close to the dispensing outlet for a range of vessel heights.

However, a large range of different beverage vessel heights are available and it can be difficult to ensure that the height-adjustment of the support is adequate to accommodate a wide variety of beverage vessels. Furthermore, the range of positions possible with this variety of beverage vessels can cause difficulties in accurately sensing and controlling beverage dispensing, particularly for automatic or semi-automatic beverage dispensers.

Therefore, it will be understood that it is desirable to provide improvements to beverage vessel support apparatus.

SUMMARY

According to a first aspect, there is provided a beverage vessel support apparatus for a beverage dispensing apparatus comprising: a height-adjustable beverage vessel support configured for supporting a beverage vessel at a plurality of different support positions; a beverage vessel support actuator configured for adjusting a height of the beverage vessel support; a beverage vessel rim detector arranged at a first vertical position and configured to determine whether an uppermost part of a beverage vessel supported by the beverage vessel support is at an appropriate position for a beverage to be dispensed into the beverage vessel; a first beverage vessel detector arranged at a second vertical position below the vertical position of the beverage vessel rim detector and configured to determine whether a beverage vessel is present on the beverage vessel support; and a second beverage vessel detector arranged at a third vertical position between the vertical positions of the beverage vessel rim detector and the first beverage vessel detector and configured to determine whether a beverage vessel is present on the beverage vessel support.

One or more of the beverage vessel rim detector, and the first and second beverage vessel detectors may be optical detectors. One or more of the detectors may be beam-break detectors, such as infrared light-level detectors having an emitter and receiver.

The plurality of support positions of the height-adjustable beverage vessel support comprise a lowermost support position and an uppermost support position, and a plurality of intermediate support positions between the lowermost and uppermost support positions.

When the beverage vessel support is at the lowermost support position, the first beverage vessel detector may be operable to determine whether a beverage vessel is present on the beverage vessel support. When the beverage vessel support is at the uppermost position, the second beverage vessel detector may be operable to determine whether a beverage vessel is present on the beverage vessel support.

The uppermost support position of the beverage vessel support may be above the vertical position of the first beverage vessel detector, such that the first beverage vessel detector is inhibited from detecting the presence of a beverage vessel when the beverage vessel support is in the uppermost support position.

An upper portion of the plurality of intermediate support positions may also be above the vertical position of the first beverage vessel detector, such that the first beverage vessel detector is inhibited from detecting the presence of a beverage vessel when the beverage vessel support is in an intermediate support position in the upper portion of the plurality of intermediate support positions.

In the uppermost support position and the upper portion of the plurality of intermediate support positions, the beverage vessel support may block the first beverage vessel detector, which may thereby inhibit detection of a beverage vessel with the first beverage vessel detector.

The uppermost support position of the beverage vessel support may be below the vertical position of the second beverage vessel detector, such that the second beverage vessel detector is operable to detect a beverage vessel on the beverage vessel support in the support position and, optionally, in an upper portion of the plurality of intermediate support positions.

The lowermost support position of the beverage vessel support may be below the vertical position of the first beverage vessel detector, such that the first beverage vessel detector is operable to detect a beverage vessel on the beverage vessel support in the lowermost support position and, optionally, in a lower portion of the plurality of intermediate support positions.

The beverage vessel support apparatus may be configured such that when the beverage vessel support is at a support position below the vertical position of the first beverage vessel detector, the first beverage vessel detector is used to detect the presence of a beverage vessel; and when the beverage vessel support is at a support position above the vertical position of the first beverage vessel detector, the second beverage vessel detector is used to detect the presence of a beverage vessel.

The first beverage vessel detector may define a crossover position of the beverage vessel support. An upper portion of the plurality of positions of the beverage vessel support may be above the crossover position, and a lower portion of the plurality of positions of the beverage vessel support may be below the crossover position. At positions of the beverage vessel support below the crossover position, the apparatus may be configured such that the first beverage vessel detector detects the presence of a beverage vessel. At positions of the beverage vessel support above the crossover position, the apparatus may be configured such that the second beverage vessel detector detects the presence of a beverage vessel.

The beverage vessel support apparatus may further comprise a beverage vessel positioning element defining a preferred position for a beverage vessel on the beverage vessel support. One or more of the beverage vessel rim detector, and the first and second beverage vessel detectors may be configured or positioned to coincide substantially or approximately with a tangent of a beverage vessel having a circular cross-section, optionally a straight-sided cylindrical beverage vessel, when positioned in the preferred position.

In a second aspect, there is provided a beverage dispensing apparatus comprising: a beverage dispensing outlet for dispensing beverage into a beverage vessel; and a beverage vessel support apparatus according to the first aspect. The height-adjustable beverage vessel support is configured for supporting a beverage vessel at a plurality of different support positions relative to the beverage vessel dispensing outlet. The beverage dispensing outlet may be a beverage dispensing outlet of the beverage dispensing apparatus, or a beverage dispensing outlet of a beverage ingredient container.

According to a third aspect, there is provided a method of operating a beverage dispensing apparatus comprising a beverage vessel support apparatus comprising: positioning a height-adjustable beverage vessel support at a lowermost support position; detecting, using a first beverage vessel detector at a first vertical position above the lowermost support position, whether a beverage vessel is present on the beverage vessel support; detecting, using a beverage vessel rim detector, whether an uppermost part of a beverage vessel supported by the beverage vessel support is at an appropriate position for a beverage to be dispensed into the beverage vessel; and: a) dispensing a beverage if it is detected that a beverage vessel is present on the support and also that the uppermost part of the beverage vessel is at the appropriate position; or b) raising the beverage vessel support if it is detected that a beverage vessel is present on the support and also that the uppermost part of the beverage vessel is not at the appropriate position; then determining whether a support position of the beverage vessel support is above a vertical position of the first beverage vessel detector; and if it is determined that the support position is above the first beverage detector, detecting, using a second beverage vessel detector at a vertical position above the first beverage vessel detector whether a beverage vessel is present on the beverage vessel support.

The method may further comprise detecting, during raising the beverage vessel support and using the beverage vessel rim detector, whether an uppermost part of a beverage vessel supported by the beverage vessel support is at an appropriate position for a beverage to be dispensed into the beverage vessel; and stopping the raising of the beverage vessel support if it is detected that the uppermost part of the beverage vessel is at the appropriate position; then dispensing a beverage.

If, after raising the beverage vessel support to an uppermost position, it is detected by the beverage vessel rim detector that an uppermost part of a beverage vessel supported by the beverage vessel support is not at an appropriate position for a beverage to be dispensed into the beverage vessel; then the second beverage vessel detector may be used to detect whether a beverage vessel remains present on the beverage vessel support. If it is detected that a beverage vessel remains present, then a beverage may be dispensed.

A controller may be provided to carry out the method of the second aspect described herein.

Any aspect may comprise any combination of the features and/or limitations referred to with respect to any of the other aspects described above, except combinations of such features as are mutually exclusive.

In another aspect, the invention may be a beverage dispensing apparatus comprising: a beverage dispensing outlet for dispensing a beverage; a movable support member having a top surface for supporting a beverage vessel below the beverage dispensing outlet, the movable support member comprising an inner telescoping element and an outer telescoping element; an actuation assembly operably coupled to the movable support member and configured to move the movable support member to modify a distance between the top surface of the movable support member and the beverage dispensing outlet; and wherein activation of the actuation assembly causes both the inner and outer telescoping elements to move simultaneously either towards or away from the beverage dispensing outlet.

In a further aspect, the invention may be a beverage dispensing apparatus comprising: a housing extending from a bottom end to a top end along a longitudinal axis; a beverage dispensing outlet for dispensing a beverage; a movable support member for supporting a beverage vessel below the beverage dispensing outlet, the movable support member comprising a first component and a second component; and an actuation assembly operably coupled to the movable support member so that upon activation of the actuation assembly the first component moves relative to the housing in one of a first vertical direction and a second vertical direction parallel to the longitudinal axis of the housing and the second component simultaneously moves relative to the first component in the same one of the first and second vertical directions.

In a still further aspect, the invention may be a beverage dispensing apparatus comprising: a housing; a beverage vessel support assembly comprising a support component that is detachably coupled to the housing, the support component comprising: a base member comprising a cavity, a top surface, and an opening in the top surface; and a movable support member at least partially positioned within the cavity of the base member; and an actuation assembly operably coupled to the movable support member and configured to move the movable support member relative to the base member between a plurality of support positions, wherein the movable support member extends through the opening in the base member and protrudes from the top surface of the base member in at least some of the plurality of support positions.

The aspects described above may provide a beverage vessel support apparatus for a beverage dispensing apparatus which can accommodate or permit the use of a greater range of beverage vessel sizes with automatic and safe operation. In particular, in order to provide automatic operation and beverage vessel positioning for vessels over a large range of vessel heights, a greater range of vertical movement of the beverage vessel support must be provided. However, this may mean that, at the higher elevations of the support required for small vessels, the beverage vessel support itself may block a beverage vessel sensor or otherwise inhibit its operation to detect the presence of a vessel. Accordingly, by providing a further beverage vessel detector at a higher vertical position, the presence of the vessel can still be verified during a vending operation to prevent vending if a vessel is removed during a vending operation. Furthermore, the aspects may allow for the use of very small vessels where the vessel rim would not reach the rim detector even in the highest support position, as the further beverage vessel detector may verify the presence of a vessel when the rim detector and lower vessel detector may be incapable.

BRIEF DESCRIPTION OF THE DRAWINGS

Embodiments of the invention will now be described, by way of example, with reference to the accompanying drawings, in which.

DETAILED DESCRIPTION OF THE DRAWINGS

Figure 1:
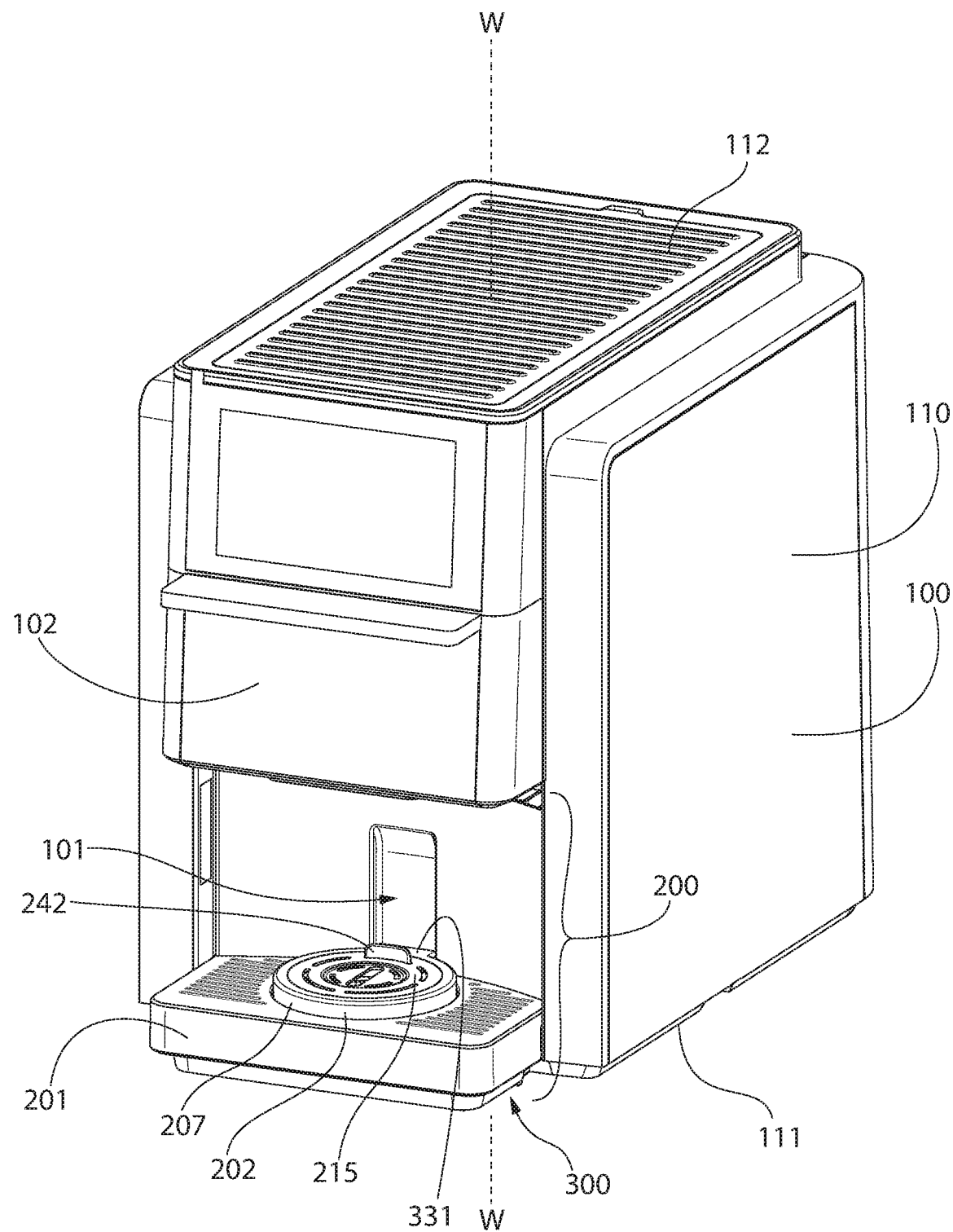
FIG. 1 is a perspective view of a beverage dispensing apparatus comprising a beverage vessel support apparatus according to an embodiment of the present invention.
Figure 2:
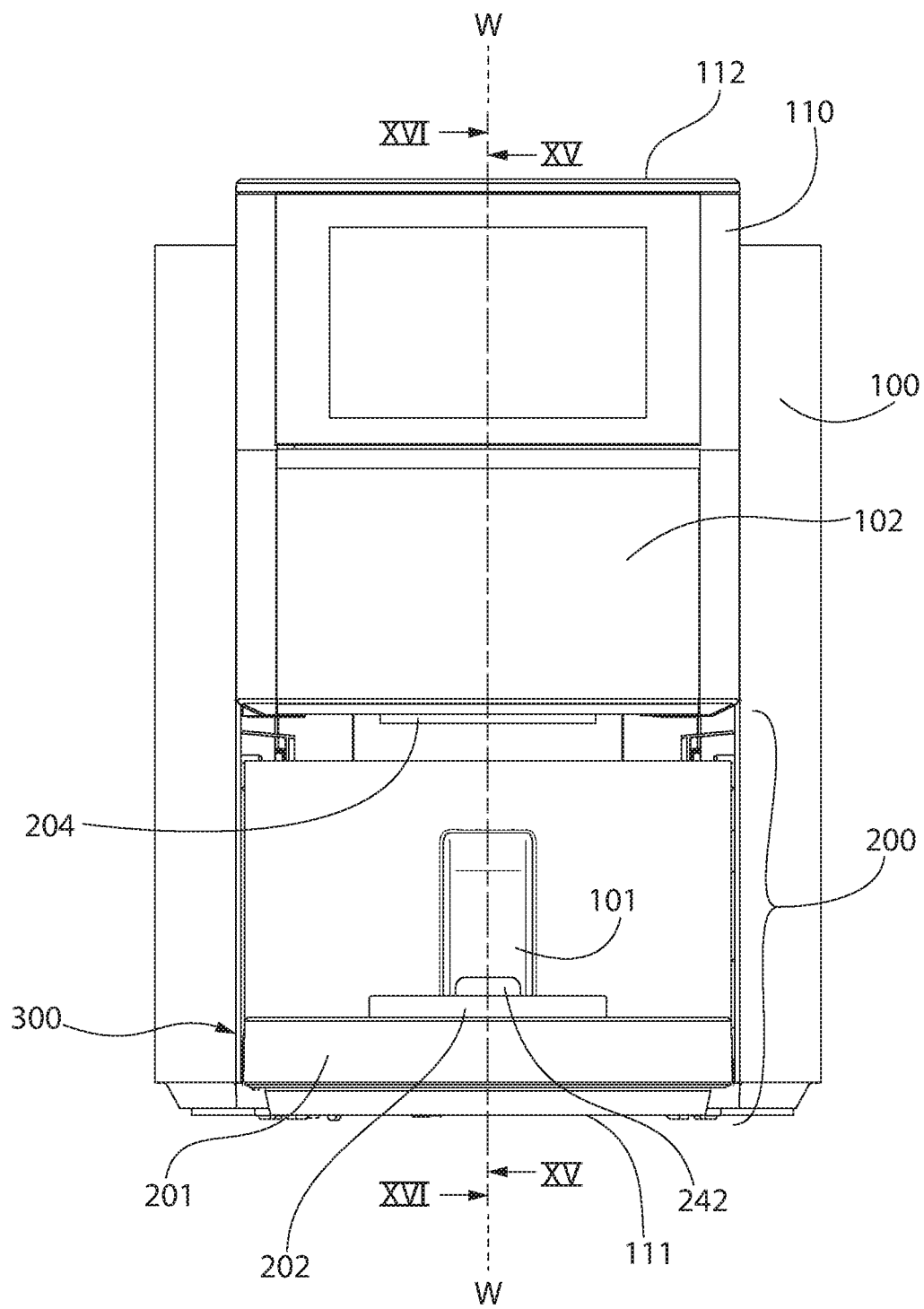
FIG. 2 is a front view of the beverage dispensing apparatus of FIG. 1.

With reference to FIGS. 1 and 2, a beverage dispensing apparatus 100 is shown in accordance with an embodiment of the present invention. The beverage dispensing apparatus 100 comprises a beverage vessel support apparatus 200, which will be described in more detail below. The beverage vessel support apparatus 200 comprises a beverage vessel support assembly 300 and a sensor apparatus 203. The beverage dispensing apparatus 100 is generally configured to dispense beverages of various types into a beverage vessel (not shown) which is placed on a movable support member 202 of the beverage vessel support assembly 300 of the beverage vessel support apparatus 200.

In the exemplified embodiment, the beverage dispensing apparatus 100 is configured to prepare hot beverages, such as coffee, for dispensing into a beverage vessel. In some examples, the beverages prepared by the apparatus 100 may be cold beverages, such as juices or chilled water. It should be understood that the present disclosure may be applicable to beverage dispensing apparatus or machines of many types.

The beverage dispensing apparatus 100 comprises a housing 110, which is the main component of the beverage dispensing apparatus 100. The housing 110 extends from a bottom end 111 to a top end 112 along an axis W-W. The housing 110 has an interior cavity that houses the electronics and other components that are required for proper operation of the beverage dispensing apparatus 100 to create and dispense a beverage. In the exemplified embodiment, the beverage dispensing apparatus 100 receives a beverage ingredient container (not shown) in a container compartment 102 of the housing 100. In a vending operation, heated water is pumped into the beverage ingredient container that is located within the container compartment 102. As the heated water passes through the beverage ingredient in the beverage ingredient container, a beverage is made. The beverage (or prepared beverage) is the dispensed from the beverage ingredient container in the container compartment 102 through a beverage dispensing outlet 204 and into a beverage vessel which is positioned on the movable support member 202 of the beverage vessel support assembly 300.

Accordingly, in the exemplified embodiment, the beverage dispensing outlet 204 is provided to position the ingredient container directly over the beverage vessel to deliver a prepared beverage to the vessel. In other embodiments, the prepared beverage may not be dispensed directly into the vessel from the container, and may be prepared within the apparatus 100 and directed, for example by a conduit system, to an alternatively configured beverage dispensing outlet of the apparatus 100 positioned above the beverage vessel support assembly 300. Other configurations are also conceivable by one skilled in the art.

Turning now to FIGS. 3-6, the beverage vessel support assembly 300, which is shown in isolation in perspective, exploded, top plan, and bottom plan views, respectively, will be described in greater detail. As noted above, the beverage vessel support assembly 300 generally comprises a support component 270 and an actuation component 271. As best seen in FIG. 4B, the support component 270 and the actuation component 271 are configured to be detached from one another, the purpose of which will be described in more detail below.

The support component 270 of the beverage vessel support assembly 300 comprises a base member 201 and the movable support member 202 on which a beverage vessel (or, simply, vessel) may be placed in order to vend beverage into the vessel, and these components will be described in greater detail below. The base member 201 comprises a base component 205 and a cover 206. The base component 205 has a floor and sidewalls that collectively define a cavity 294 that is configured to retain an amount of liquid that may be dispensed from the beverage dispensing outlet 204 and not into a beverage vessel. The cover 206 closes the open top end of the cavity 294. Furthermore, the cover 206 comprises a plurality of drainage apertures 208 that lead to the cavity 294 within the base member 201. Thus, any part of a liquid/beverage that is dispensed and does not end up in the vessel/container may pass through the drainage apertures 208 in the cover 206 and flow into the cavity 294 of the base component 205 until the base component 205 is cleaned by a user/operator. The base member 205 may be designed with a pour spout 219 in one of its sidewalls to facilitate removal of liquid from the cavity 294. In the exemplified embodiment, the cover 206 of the base member 201 also comprises an opening 207 and the movable support member 202 may extend through the opening 207 in the cover 206 of the base member 201. Specifically, the movable support member 202 may be positioned within he cavity 294 of the base component 205 and a portion of the movable support member 202 may protrude through the opening 207 in the cover 206 of the base member 201, depending on the particular height that the movable support member 202 is adjusted to as described herein below.

The base component 205 comprises a floor 227 and one or more lifting members 228 protruding from the floor 227. In the exemplified embodiment, there are three of the lifting members 228, but the invention is not to be so limited in all embodiments and fewer or greater than three of the lifting members 228 may be included in other embodiments. Each of the lifting members 228 comprises a follower member 229 that rides along a track a component of the movable support member 202 as described in more detail below. The base component 205 and all of its parts are stationary during operation of the movable support member 202. Thus, the lifting members 228 are fixedly coupled to the floor 227 of the base component 205 and they do not move during operation of the apparatus. Specifically, the lifting members 228 have a role in the movement of the movable support member 202, which will be described in greater detail below, but their role is achieved without the lifting members 228 being required to move.

Figure 3:
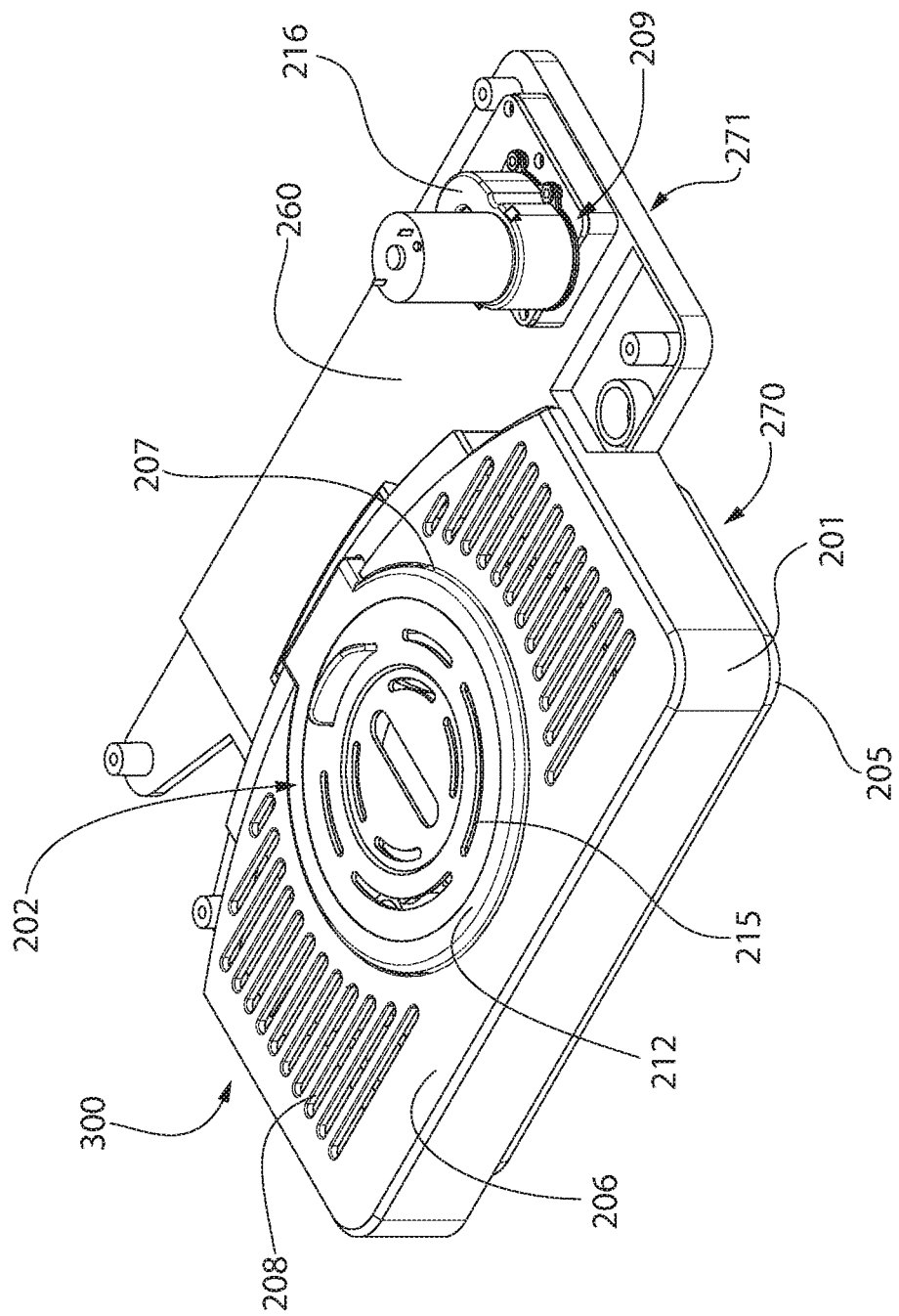
FIG. 3 is a perspective view of the beverage vessel support of the beverage dispensing apparatus of FIG. 1.
Figure 6:
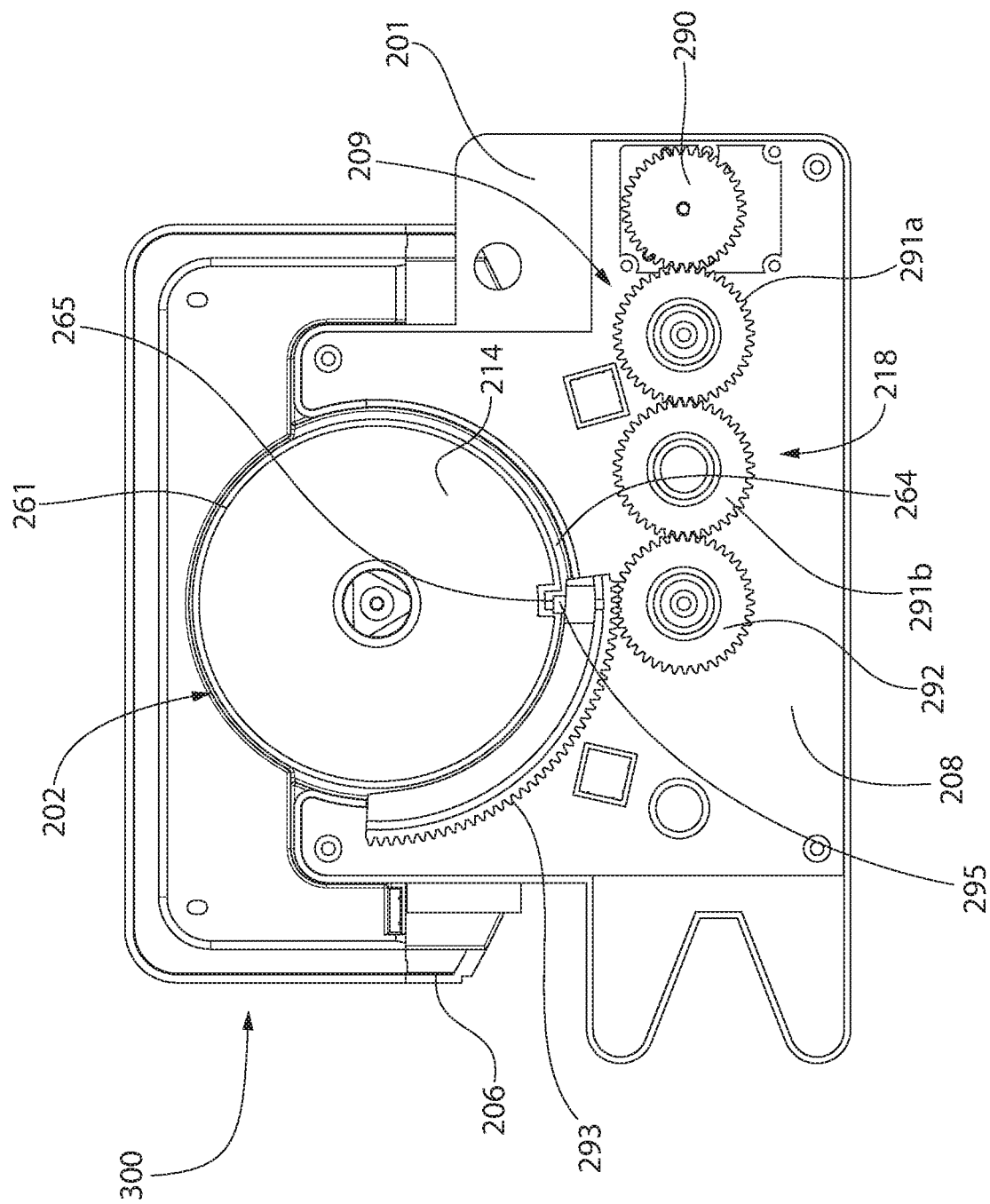
FIG. 6 is a bottom view of the beverage vessel support of FIG. 3.

Furthermore, as best shown in FIGS. 2, 3 and 6, the beverage vessel support assembly 300, and more specifically the actuation component 271 thereof, comprises an actuation assembly 209. The actuation assembly 209 comprises a plate member 260 (which includes an upper plate 260a and a lower plate 260b that are coupled together when the plate member 260 is assembled) as well as the components that operate to move the movable support member 202 between a lowermost position (see FIG. 15) and an uppermost position (see FIG. 17). Specifically, the actuation assembly 209 generally comprises a motor 216 and a gear train 218 that are operably coupled to the plate member 260. More specifically, the motor 216 is located on a top surface of the plate member 260 and the gears of the gear train 218 are located on a bottom surface of the plate member 260. Stated another way, the motor 216 is coupled to the upper plate 260a of the plate member 260 and the gear train 218 is coupled to the lower plate 260b of the plate member 260. In the exemplified embodiment, the motor 216 and the gear train 218 are coupled to the plate member 260 of the actuation component 271 of the beverage vessel support assembly 300. Specifically, when the upper and lower plate members 260a, 260b are coupled together, the motor 216 is coupled to the gear train 218, as described in more detail below. The actuation component 271 of the beverage vessel support assembly 300 is configured to be positioned within the beverage dispensing apparatus 100 in a fixed manner Thus, while the support component 270 can be detached from the remainder of the beverage dispensing apparatus 100, the actuation component 271 remains coupled to the beverage dispensing apparatus 100 at all times (although in other embodiments it may be possible to remove the actuation component 271 from the housing 110).

The gear train 218 is a rack and pinion-type gear train in the exemplified embodiment, but it could take on other forms in other embodiments. In the exemplified embodiment, the gear train 218 generally comprises a driver gear 290 that is coupled directly to the motor 216 (when the upper and lower plates 260a, 260b are coupled together) so that the driver gear 290 rotates when the motor 216 is activated and rotating, two idler gears 291a, 291b, and a driven gear 292. The driven gear 292 interacts with a rack 293, which is operably coupled to the movable support member 202 such that movement of the rack 293 due to interaction with the driven gear 292 causes the movable support member 202 to move between the lowermost and uppermost positions. The motor 216 is operably coupled to a power source (not shown) and there may be a switch between the motor 216 and the power source to control activation of the motor 216 and hence also height adjustment of the movable support member 202 as described herein. Other configurations for adjusting the height of the movable support member 202 are also conceivable, such as hydraulic or pneumatic actuation. Furthermore, the rack 293 could be replaced with another gear. Moreover, in the exemplified embodiment the rack 293 is arcuate shaped, but in other embodiments it could be linear while still achieving the same function described herein.

In the exemplified embodiment, each of the gears 290-292 of the gear train 218 lie in the same plane. Specifically, bottom surfaces of the driver gear 290, the idler gears 291a, 291b, and the driven gear 292 are coplanar. This helps to make the device with a low-profile while still enabling it to have the movable support member 202 as described herein.

Figure 4A:
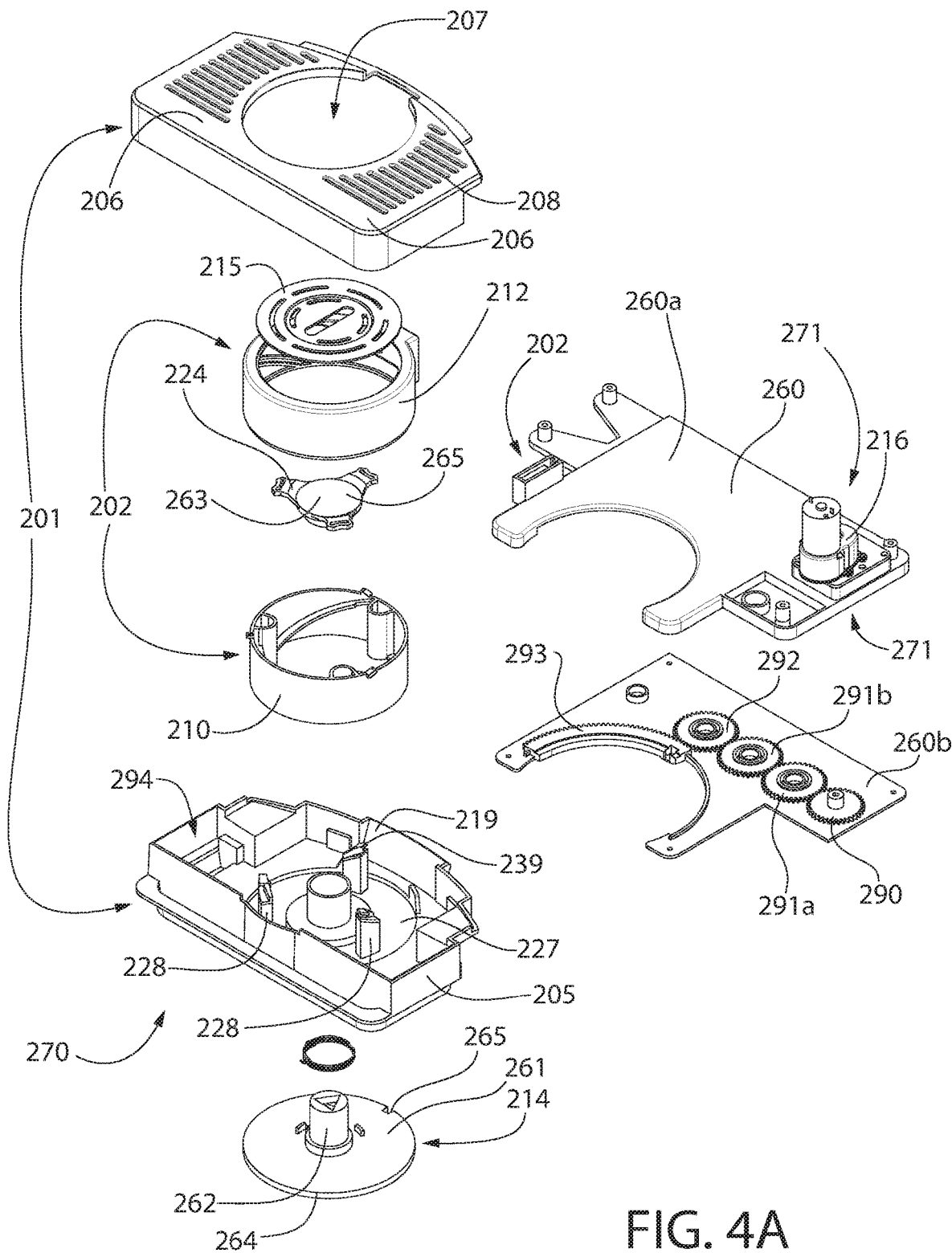
FIG. 4A is an exploded view of the beverage vessel support of FIG. 3.
Figure 4B:
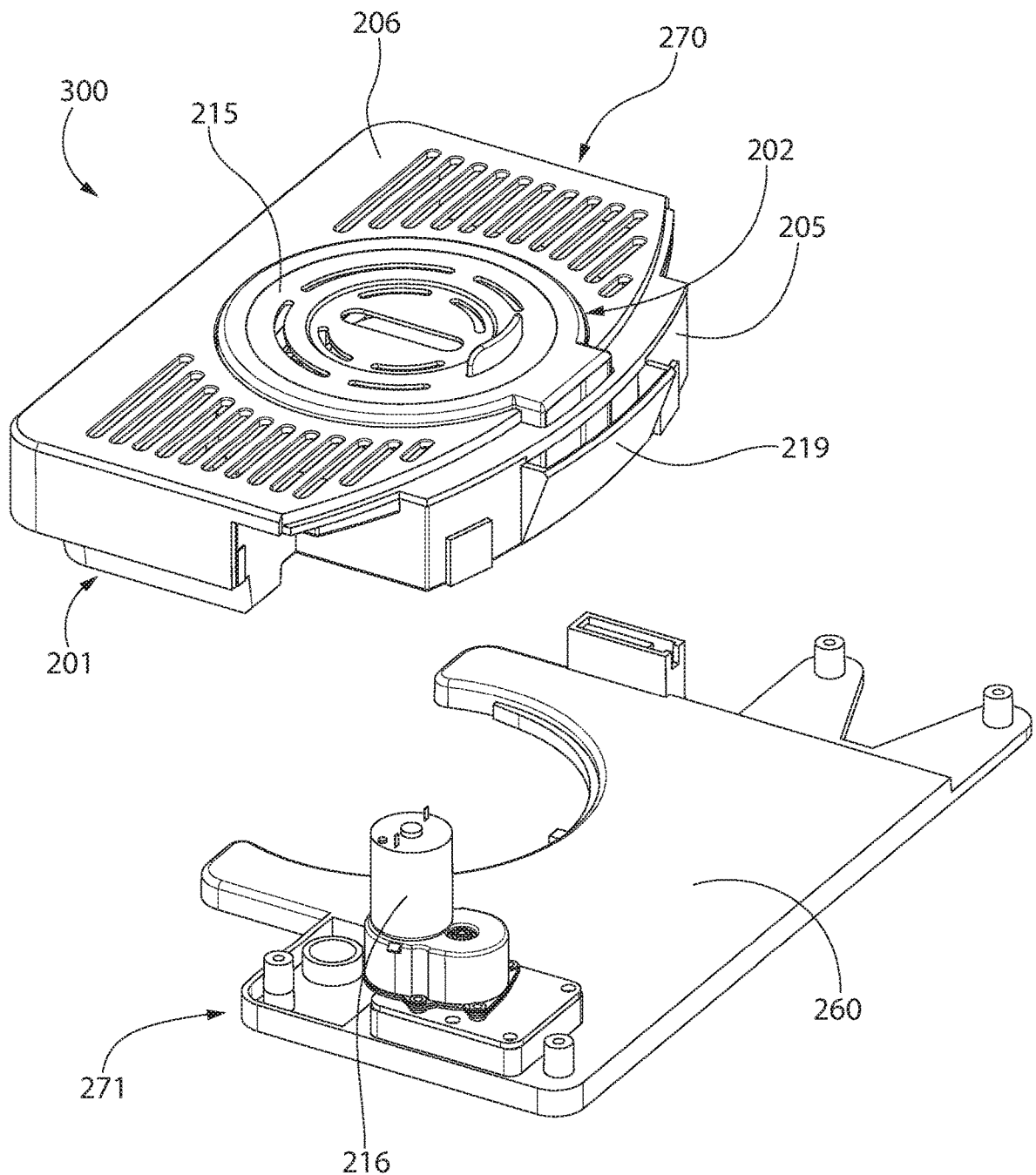
FIG. 4B is a partially exploded view of the beverage vessel support of FIG. 3 illustrating a support component of the beverage vessel support detached from an actuation component of the beverage vessel support.
Figure 17:
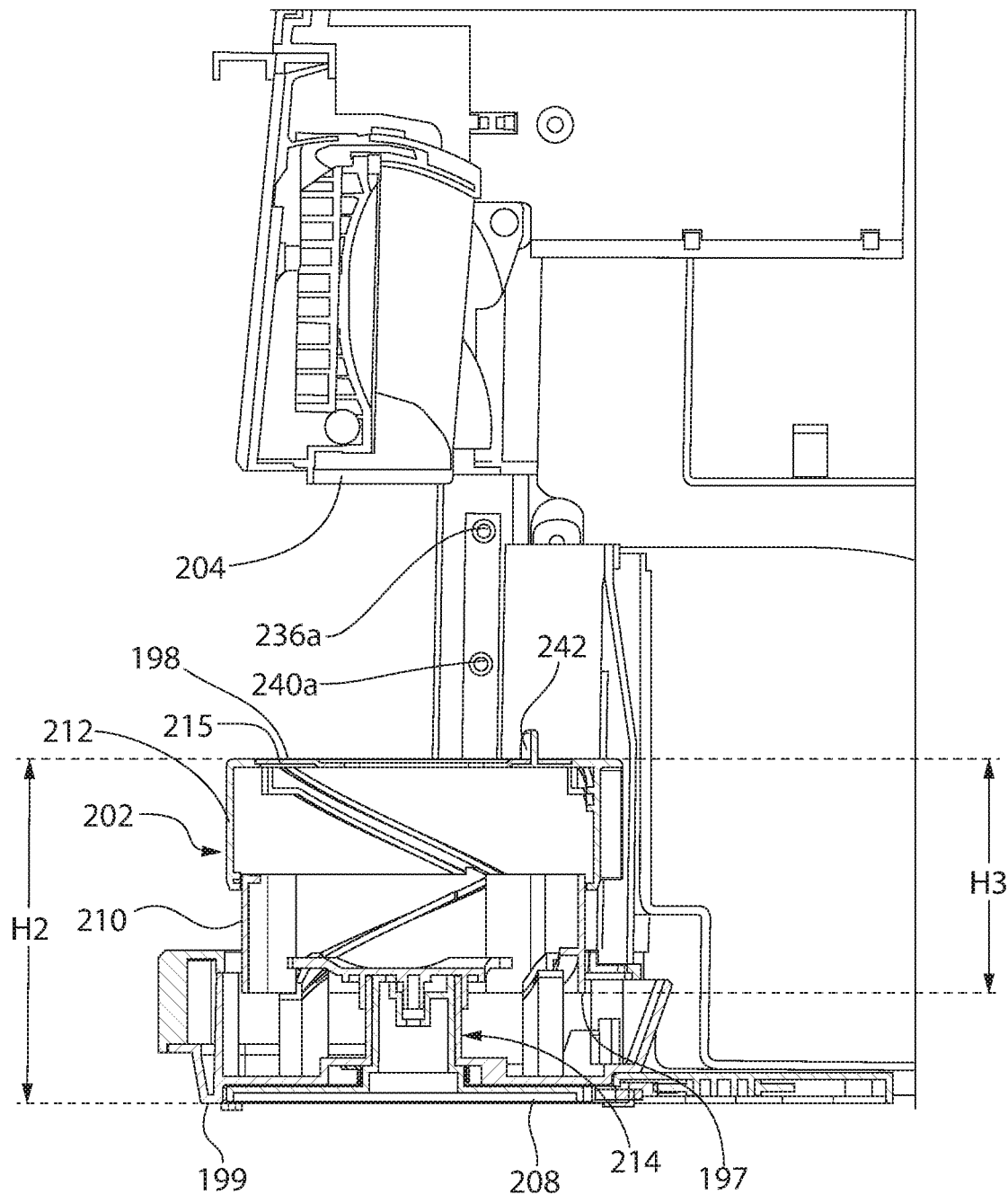
FIG. 17 is the cross-sectional view of FIG. 15 with the movable support member of the beverage vessel support in the uppermost position.

Referring again to FIGS. 3-6 with a particular reference to FIG. 4A, in the exemplified embodiment the movable support member 202 is a double-helix telescoping apparatus that enables the movable support member 202 to have a low profile when in the lowermost position while enabling it to more than double in height when extended to the uppermost position. In that regard, the movable support member 202 comprises an inner telescoping element 210 and an outer telescoping element 212 (the inner and outer telescoping elements 210, 212 may be referred to as a first component and a second component, whereas the first component could refer to either one of the inner and outer telescoping elements and the second component could refer to either one of the inner and outer telescoping elements). In the exemplified embodiment, the outer telescoping element 212 at least partially surrounds the inner telescoping element 210, although a greater portion of the inner telescoping element 210 may be surrounded by the outer telescoping element 212 in the lowermost position (FIG. 15) than the uppermost position (FIG. 17).

Furthermore, the beverage vessel support assembly 300 also comprises a rotator assembly 214. The rotator assembly 214 is positioned functionally between the actuation assembly 209 and the movable support member 202. Thus, the actuation assembly 209 causes the rotator assembly 214 to rotate, which in turn causes the movable support member 202 to alter between the lowermost and uppermost positions as described further herein below. The rotator assembly 214 generally comprises an engagement plate 261 that interacts with the rack 293 to rotate the engagement plate 261, a shaft 262 protruding from a top surface of the engagement plate 261, and a rotator member 263 that interacts with the inner telescoping element 210 as described in more detail below. The engagement plate 261, the shaft 262, and the rotator member 263 are coupled together so that rotation of any one of those components results in rotation of all of those components. Thus, as the engagement plate 261 is made to rotate as described below, so too does the shaft 262 and the rotator member 263 rotate.

Referring to FIGS. 4A and 6, the interaction between the gear train 218 and the rotator assembly 214 that causes the rotator assembly 214 to rotate will be described. In the exemplified embodiment, the engagement plate 261 is a round-shaped plate having a peripheral edge 264. The peripheral edge 264 of the engagement plate 261 comprises a notch 265. Furthermore, as shown in FIG. 6, the rack 293 that is operably coupled to the driven gear 292 of the gear train 218 comprises a protuberance 295 that nests within the notch 265 in the peripheral edge 264 of the engagement plate 261. Thus, as the rack 293 is made to move via interaction with the driven gear 292 of the gear train 218, that movement is imparted to the engagement plate 261 due to the protuberance 295 of the rack 293 being located within the notch 265 of the engagement plate 261. Thus, as the rack 293 rotates clockwise or counterclockwise, the engagement plate 261 (and hence the entirety of the rotator assembly 214) moves the same amount in the same direction.

Figure 8:
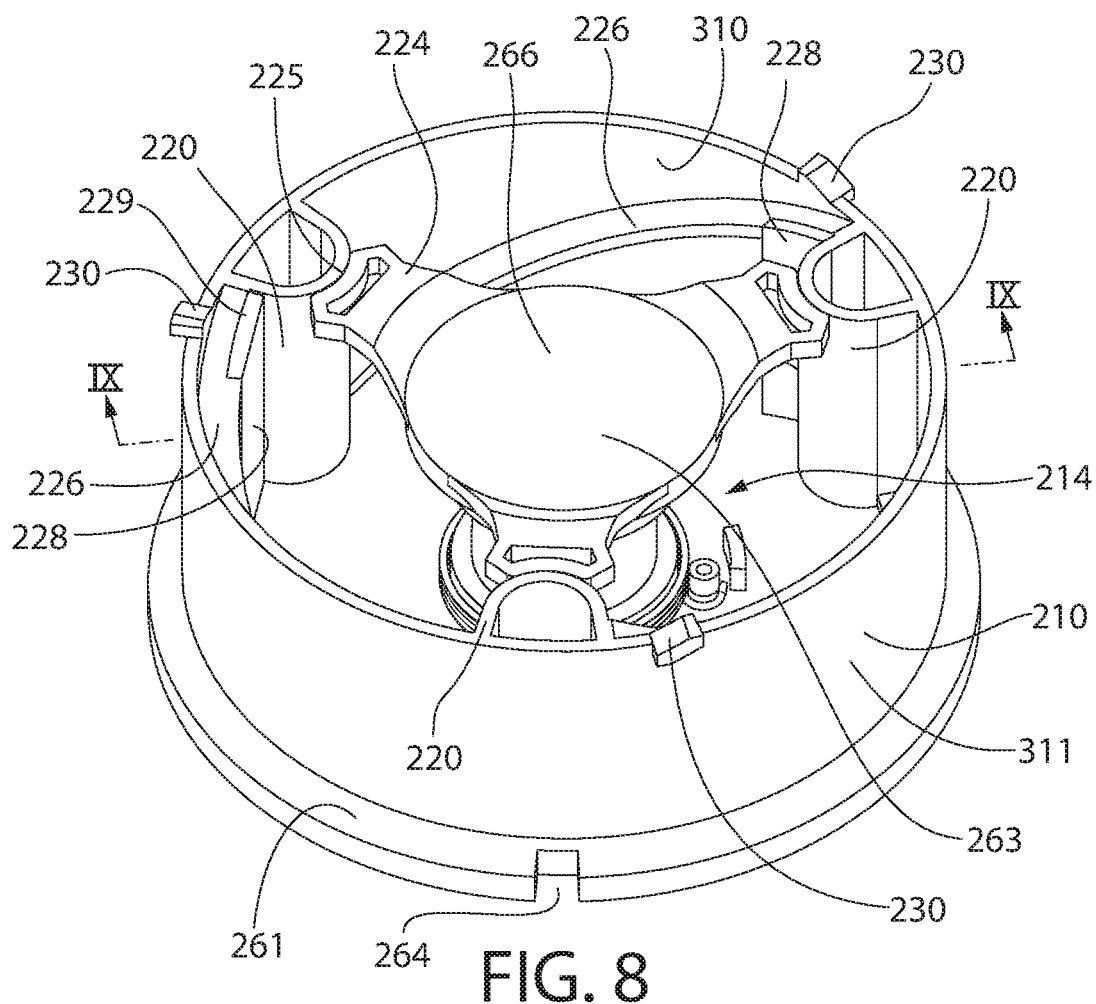
FIG. 8 is a perspective view of the inner telescoping element of FIG. 7 with a rotary element located therein.
Figure 9:
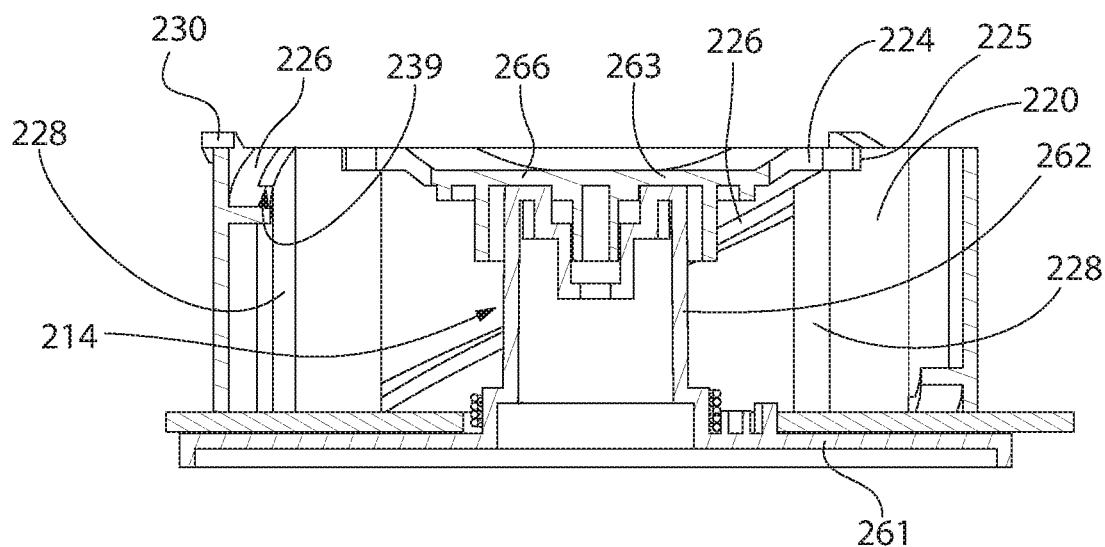
FIG. 9 is a cross-sectional view taken along line IX-IX of FIG. 8.

Referring to FIGS. 4A, 8, and 9, the rotator member 263 is coupled directly to a distal end of the shaft 262. As a result, as the engagement plate 261 and the shaft 262 rotate due to the engagement between the engagement plate 261 and the rack 293, the rotator member 263 also rotates. In the exemplified embodiment, the engagement plate 261 and the shaft 262 form a part of a unitary structure (see, for example, FIG. 9) and the rotator member 263 is mechanically coupled to the shaft 262. The rotator member 263 comprises a hub portion 266 and a plurality of engagement members 224 extending from the hub portion 266 in a circumferentially spaced apart manner Each of the engagement members 224 terminates in a distal edge 225 that, in the exemplified embodiment, is concave. The purpose of having the distal edges 225 of the engagement member 224 with a concave shape will be better understood from the description below regarding the interaction between the rotator member 263 and the inner telescoping element 210. In alternative embodiments, the distal edges 225 of the engagement member 224 could be convex as will be discussed below as well.

Figure 7:
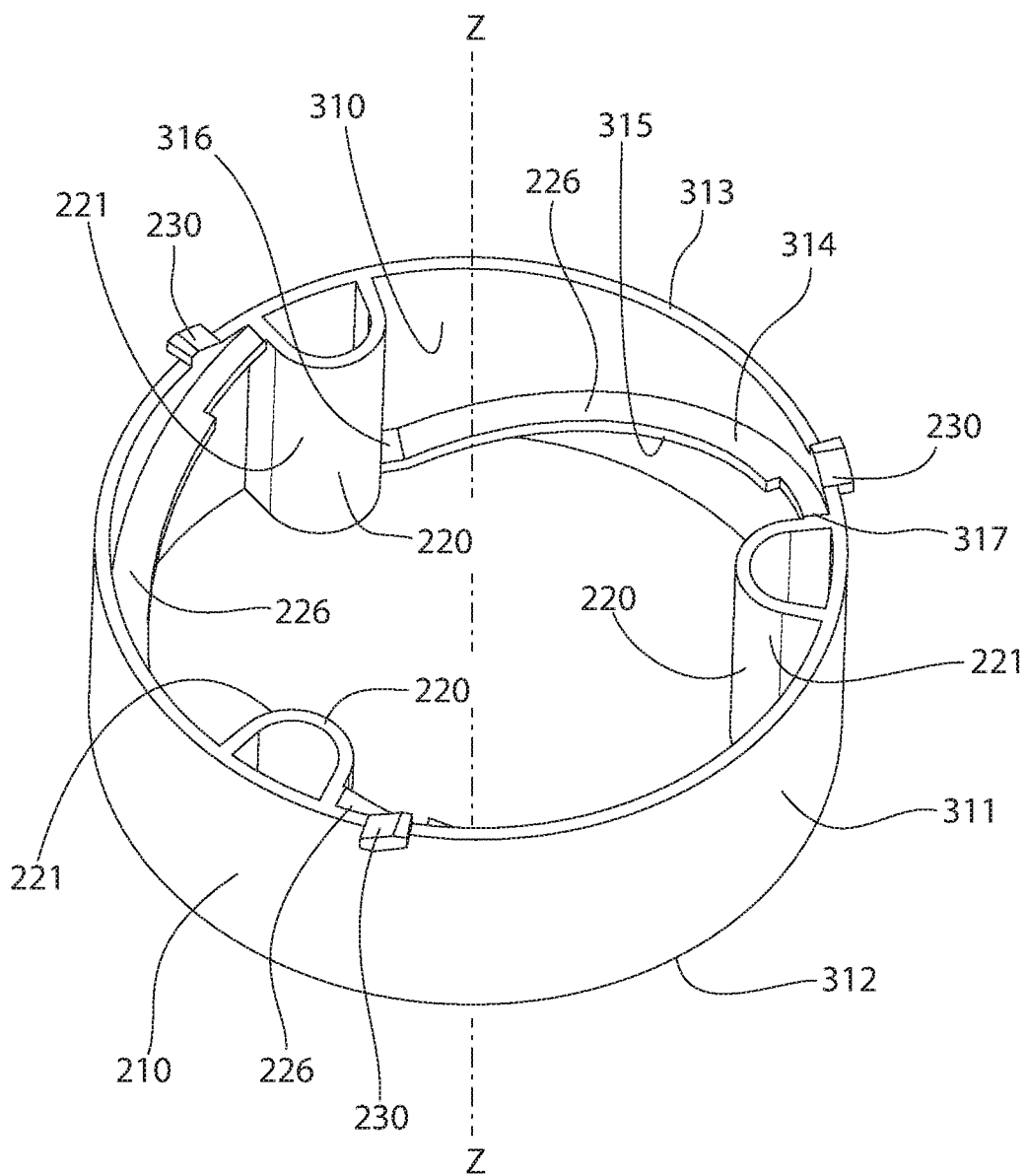
FIG. 7 is a perspective view of an inner telescoping element of a movable support member of the beverage vessel support of FIG. 3.

Referring to FIG. 7, the inner telescoping element 210 will be described in greater detail, followed by an additional description of FIGS. 8 and 9 to describe the interaction between the rotator member 263 of the rotator assembly 214 with the inner telescoping element 210. The inner telescoping element 210 is a cylindrical shaped structure (or more specifically a ring-shaped structure) in the exemplified embodiment having an inner surface 310 and an outer surface 311. Furthermore, the inner telescoping element 210 extends from a bottom end 312 to a top end 313 along a central axis Z-Z. The inner telescoping element 210 is a hollow ring-shaped structure such that the inner surface 310 thereof surrounds an empty space. Furthermore, there are openings formed into the top and bottom ends 312, 313 of the inner telescoping element 210.

The inner telescoping element 210 comprises a plurality of vertically extending protrusions 220 that extend from the inner surface 310 in a circumferentially spaced apart manner. In the exemplified embodiment, there are three of the vertically extending protrusions 220, but more or less than three of the vertically extending protrusions 220 may be used in various different embodiments. Each of the vertically extending protrusions 220 extends from the bottom end 312 of the inner telescoping element 210 to the top end 313 of the inner telescoping element 210 in the exemplified embodiment, although the exact height of the vertically extending protrusions 220 may be modified in alternative embodiments. In the exemplified embodiment, each of the vertically extending protrusions 220 has a convex outer surface 221 that faces the central axis Z-Z of the inner telescoping element 210 to facilitate engagement between the distal edges 225 of the engagement members 224 of the rotator member 263 therewith, as described further below with reference to FIGS. 8 and 9.

In alternative embodiments, the vertically extending protrusions 220 could be replaced with vertically extending recesses or indents having the same geographical imprint. The vertically extending protrusions 220 are designed to engage with the concave distal ends 225 of the engagement members 224 whereas vertically extending recesses would be designed to engage with engagement members 224 if they had convex distal ends. Of course, other features could be provided as alternatives to the vertically extending protrusions 220 and the engagement members 224 while still ensuring that the rotator member 263 can be operably coupled to the inner telescoping element 210 as described herein.

The inner telescoping element 210 also comprises a plurality of ramp elements. Each of the ramp elements 226 extends along a portion of the inner surface 310 of the inner telescoping element 210 and as it extends circumferentially it also extends from the bottom end 312 to the top end 313 of the inner telescoping element 210. Thus, the ramp elements 226 are helical in the exemplified embodiment. The ramp elements 226 protrude from the inner surface 310 of the inner telescoping element 210 and they comprise a top surface 314 and a bottom surface 315. In the exemplified embodiment, there are three of the ramp elements 226 but in other embodiments different numbers of ramp elements could be used. Each of the ramp elements 226 extends between two adjacent ones of the vertically extending protrusions 220. Thus, each of the ramp elements 226 has a first end 316 that is coupled to or adjacent to an outer surface of one of the vertically extending protrusions 220 and a second end 317 that is coupled to or adjacent to an outer surface of another one of the vertically extending protrusions 220. The ramp elements 226 are helically arranged such that the first and second ends 316, 317 thereof are at different elevations.

Finally, the inner telescoping element 210 comprises a plurality of projections 230 that extend radially outward from the outer surface 311 of the inner telescoping element 210 at the top end 313 thereof. In the exemplified embodiment, each of the projections 230 protrudes from the outer surface 311 and/or from the top end 313 of the inner telescoping element 210. The projections 230 are arranged in a circumferentially spaced apart manner. In the exemplified embodiment, there are three of the projections 230, although more or less than three of the projections 230 may be used in other embodiments. The projections 230 interact with a portion of the outer telescoping elements 212 in order to facilitate the telescoping movement thereof during transition of the movable support member 202 between the lowermost and uppermost positions.

Turning again to FIGS. 8 and 9, the interaction between the rotator member 263 of the rotator assembly 214 with the inner telescoping element 210 of the movable support member 202 will be described. The rotator member 263 is suspended within the interior of the inner telescoping element 210 due to its coupling to the shaft 262 as described above. Furthermore, the rotator member 263 is oriented so that each of the engagement members 224 of the rotator member 263 is aligned with one of the vertically extending protrusions 220 of the inner telescoping element 210. More specifically, the concave distal edges 225 of each of the engagement members 224 is in contact with the outer surface 221 of one of the vertically extending protrusions 220. Due to this contact, as the rotator member 263 rotates via its operable coupling to the gear train 218 and motor 216, the inner telescoping element 210 also rotates. Furthermore, the inner telescoping element 210 will rotate the same amount/distance as the rotator member 263 due to the coupling of those two components to one another.

Moreover, as can be seen in FIG. 8 (and also in FIGS. 13 and 14 which will be described below), the lifting elements 228 of the base component 205 are in engagement with the ramp elements 226 of the inner telescoping element 210. More specifically, the follower member 229 of each of the lifting elements 228 comprises a channel 239 (labeled in FIGS. 4A, 9 and 14) within which the ramp elements 226 nest. As noted above, the lifting elements 228 and the follower members 229 thereof are formed integrally with the base component 205 and therefore they are fixed or non-movable. Therefore, as the inner telescoping element 210 rotates in a counterclockwise direction (due to its engagement with the rotatory element 263 that rotates), the inner telescoping element 210 is forced to move vertically upward. As the inner telescoping element 210 rotates in a clockwise direction, the inner telescoping element 210 is forced to move vertically downward. Specifically, because the ramp element 226 is helical, as the inner telescoping element 210 rotates, the engagement between the ramp elements 226 and the lifting elements 228 forces the inner telescoping element 210 to move vertically upwardly and downwardly dependent upon the direction of rotation of the inner telescoping element 210.

Thus, as the inner telescoping element 210 is rotated clockwise, the lifting elements 228 engage with the ramp elements 226 and the inner telescoping element 210 is lifted vertically as it rotates and as the inner telescoping element 210 is rotated counterclockwise, the lifting elements 228 engage with the ramp elements 226 and the inner telescoping element 210 is lowered vertically as it rotates. As the vertically extending protrusions 220 extend vertically from the uppermost to the lowermost edges of the inner telescoping element 210, the engaging portions 224 of the rotator member 263 remain in contact with the inner telescoping element 210 at all times during its vertical movement. It should be appreciated that the components of the rotator assembly 214 (the engagement plate 261, the shaft 262, and the rotator member 263) rotate, but they do not move vertically upwardly or downwardly. Rather, the inner telescoping element 210 moves upwardly/downwardly relative to the rotator assembly 214 and the rotator assembly 214 remains at the same elevation at all times. Stated another way, the movable support member 202 moves upwardly/downwardly but the rotator assembly 214 does not.

Figure 10:
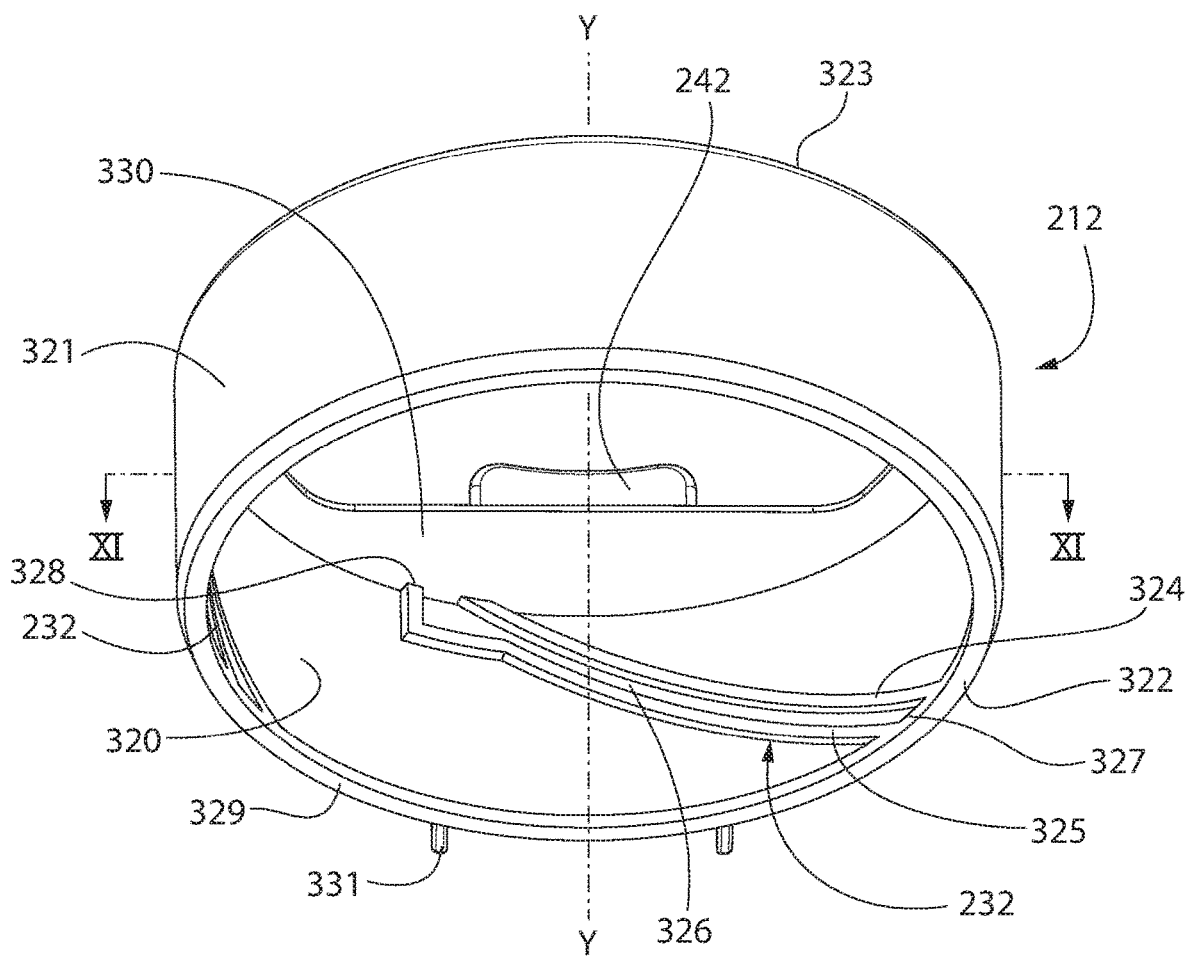
FIG. 10 is a bottom perspective view of an outer telescoping element of the movable support member of the beverage vessel support of FIG. 3.
Figure 11:
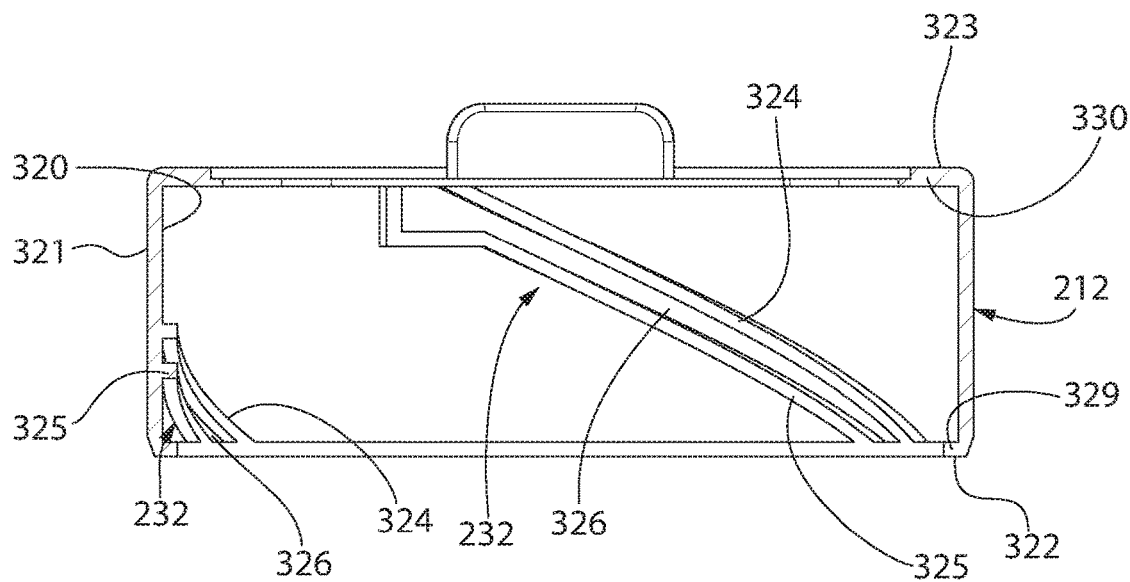
FIG. 11 is a cross-sectional view taken along line XI-XI of FIG. 10.

Referring to FIGS. 10 and 11, the outer telescoping element 212 will be described. The outer telescoping element 212 is generally cylindrical shaped, or more specifically ring-shape because it has a hollow interior. The outer telescoping element 212 comprises an inner surface 320 and an outer surface 321 and the outer telescoping element 212 extends from a bottom end 322 to a top end 323 along a central axis Y-Y. Because the outer telescoping element 212 is ring-shaped, the inner surface 320 thereof surrounds an empty space and there are openings in both the bottom and top ends 322, 323. The outer telescoping element 212 comprises a plurality of tracks 232 on the inner surface 320. More specifically, in the exemplified embodiment there are three of the tracks 232, although more or less than three of the tracks 232 could be used in other embodiments. Each of the tracks 232 comprises a first protrusion 324 and a second protrusion 325 that are spaced apart from one another by a gap that forms a channel 326 of the track 232.

Each of the tracks 232 are helical in that they extend around a portion of the inner surface 320 of the outer telescoping element 212 and as they extend circumferentially, they also extend at upwardly or downwardly (depending on the circumferential direction). Thus, the tracks 232 have a first end 327 that is located at or adjacent to the bottom end 322 of the outer telescoping element 212 and a second end 328 that is located at or adjacent to the top end 323 of the outer telescoping element 212, with the first and second ends 327, 328 being circumferentially offset from one another.

The outer telescoping element 212 also comprises a first annular flange 329 extending radially inward from the inner surface 320 along the bottom end 322 and a second annular flange 330 extending radially inward from the inner surface 320 along the top end 323. The first end 327 of the tracks 232 abut the first annular flange 329 and the second end 328 of the tracks 232 abut the second annular flange 330. As will be described further below, the projections 230 of the inner telescoping element 210 ride along the tracks 232 within the channels 326 thereof and thus the first and second annular flanges 329, 330 prevent the projections 230 from being removed from the channels 326 of the tracks 232.

Finally, the outer telescoping element 212 comprises an anti-rotation feature 331. In the exemplified embodiment, the anti-rotation feature 331 is a protrusion extending from the outer surface 321 of the outer telescoping element 212. Referring briefly to FIG. 1, in the assembled beverage dispensing apparatus 100, the anti-rotation feature 331 of the outer telescoping element 212 nests within a recess (or anti-rotation feature) 101 of the beverage dispensing apparatus 100. This interaction between the anti-rotation feature 331 and the recess 101 ensures that the outer telescoping element 212 does not rotate. As will be appreciated from the description below, preventing rotation of the outer telescoping element 212 ensures that the outer telescoping element 212 is able to move vertically rather than simply spin in place. Thus, the engagement of the anti-rotation feature 331 in the vertically extending recess 101 (or guide track) prevents rotation of the outer telescoping element 212 and restricts its movement path to a purely vertical translation, preventing rotation.

Although the anti-rotation feature 331 is illustrated as a protrusion in the exemplified embodiment, the invention is not to be so limited in all embodiments. In some embodiments, the anti-rotation feature 331 may be a recess and the beverage dispensing apparatus 100 may comprise a protrusion that interacts with the recess to prevent rotation of the outer telescoping element 212. Other structural features are also possible for the anti-rotation feature 331 within the scope of the invention set forth herein.

Referring to FIGS. 1, 3, 4A, 4B, and 5, a perforated cover element 215 is provided on the upper surface of the movable support member 202 onto which a beverage vessel may be placed during use. The perforations in the cover element 215 permit waste liquid to drain to the cavity 294 (i.e., a waste liquid compartment) of the base component 205.

Figure 5:
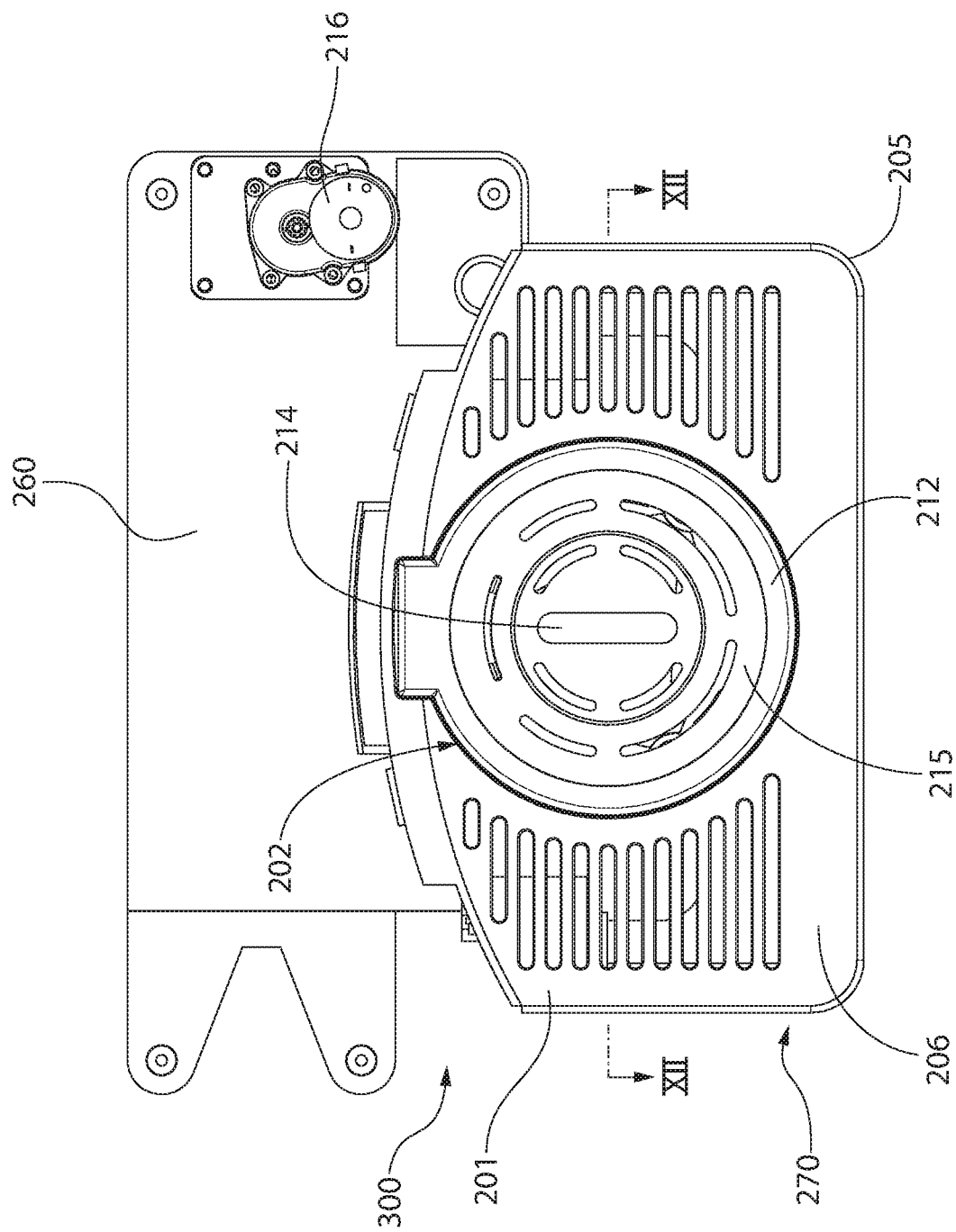
FIG. 5 is a plan view of the beverage vessel support of FIG. 3.
Figure 12:
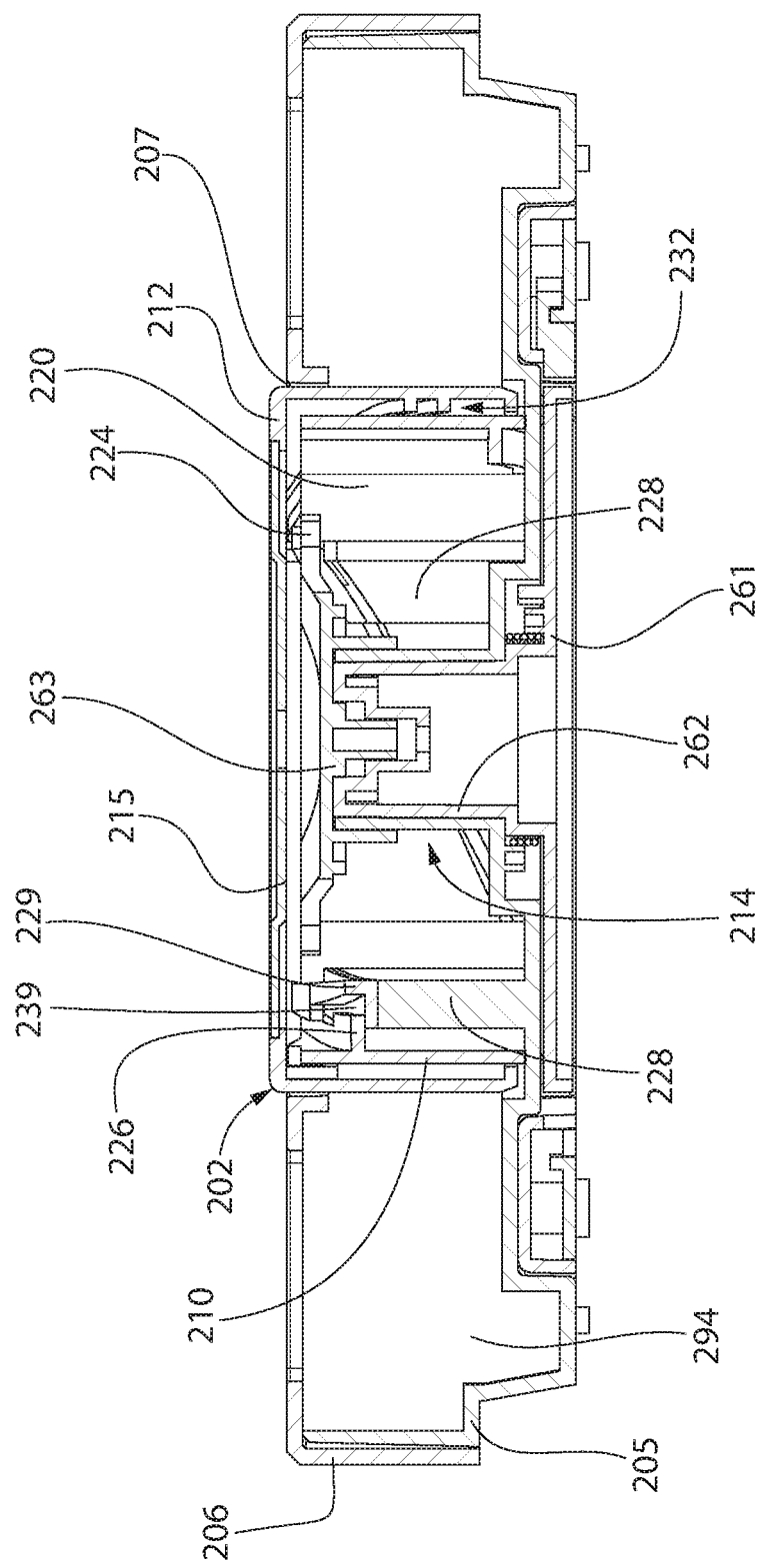
FIG. 12 is a cross-sectional view taken along line XII-XII of FIG. 5.

FIG. 12 illustrates a cross-sectional view taken along line XII-XII of FIG. 5 through the support component 270 of the beverage vessel support assembly 300. This view shows the interaction between the follower members 229 of the lifting members 228 and the ramp elements 226 of the inner telescoping elements 210. The interaction between the rotator member 263 and the inner telescoping element 210 is also visible. However, the interaction between the projections 230 of the inner telescoping element 210 and the tracks 232 of the outer telescoping element 212 is not shown in this view, but that interaction is shown in and will be described with reference to FIGS. 13 and 14. FIG. 12 is labeled with reference numerals consistent with the description provided above to provide an understanding of the interaction between all of the various components, features, and elements. A detailed description of each component will not be specifically provided with regards to FIG. 12 in the interest of brevity.

Figure 13:
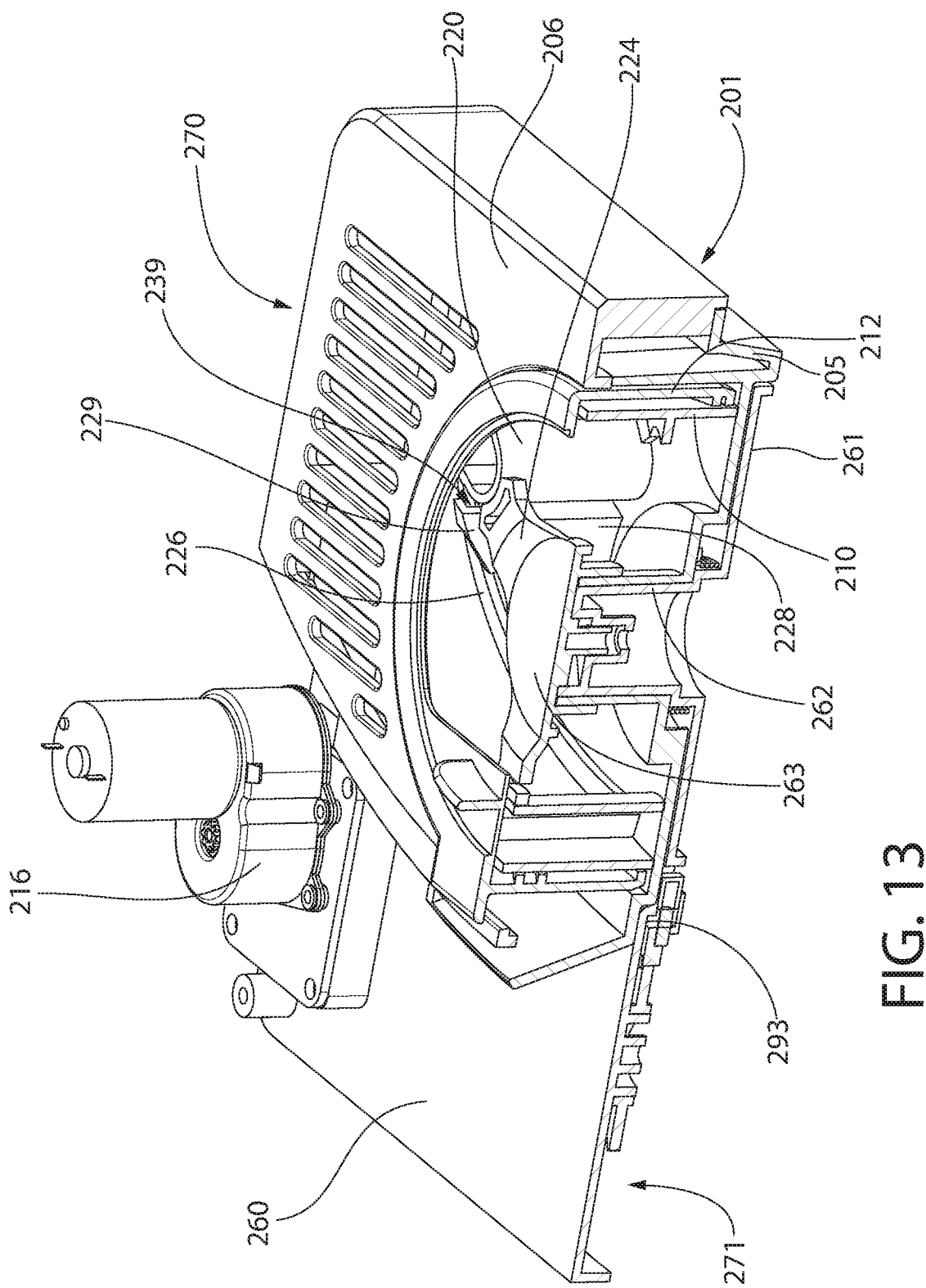
FIG. 13 is a partially cut-away view of the beverage vessel support with the movable support member thereof in a lowermost position.
Figure 14:
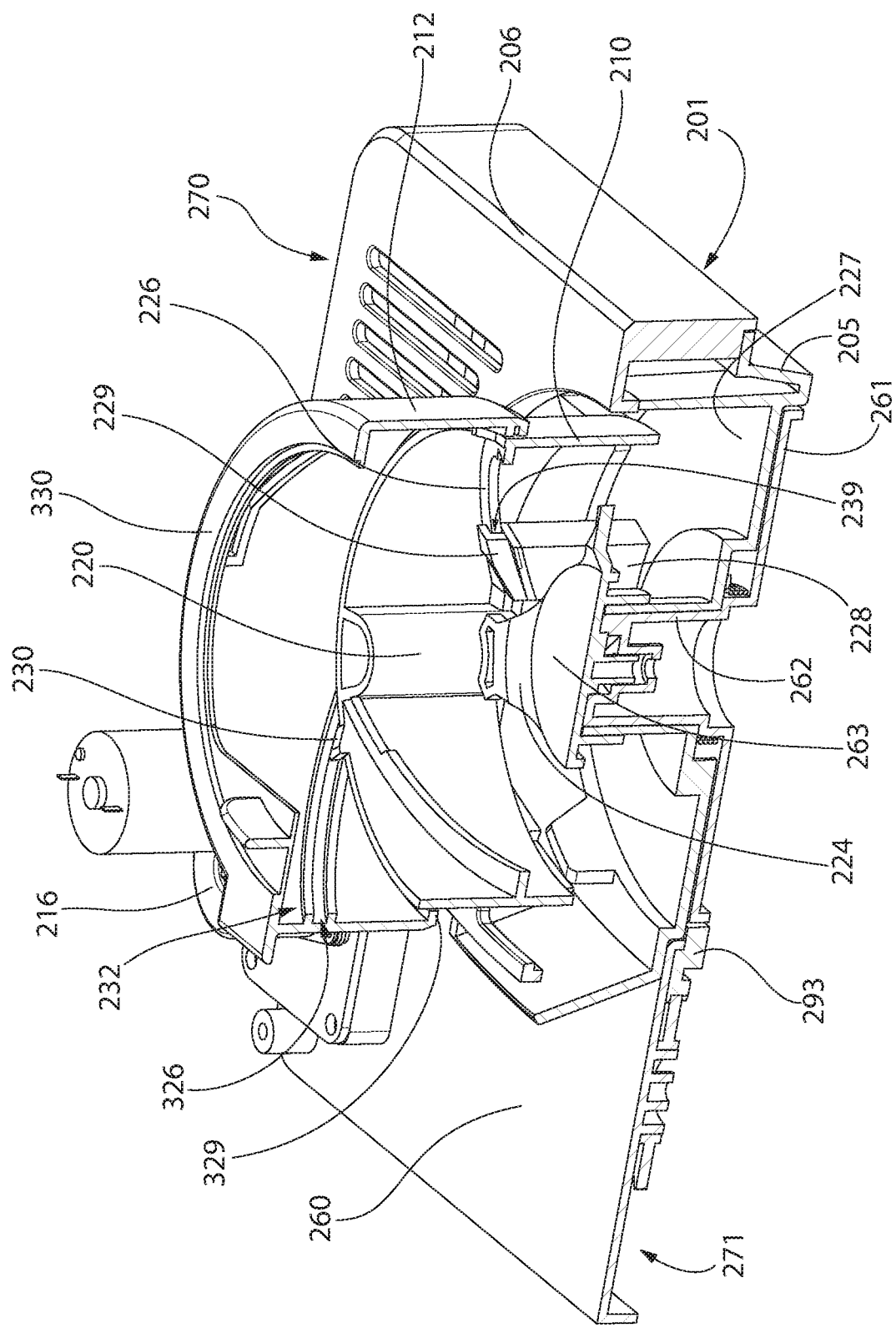
FIG. 14 is the partially cut-away view of the beverage vessel support of FIG. 13 with the movable support member thereof in an uppermost position.

Referring now to FIGS. 13 and 14, the interaction of the components of the movable support member 202 and that rotator assembly 214 that enable the movable support member 202 to move vertically for height adjustment will be described. FIG. 13 illustrates the movable support member 202 in the lowermost position and FIG. 14 illustrates the movable support member 202 in the uppermost position. As can be seen, and as will be described again with reference to FIGS. 15 and 17, the movable support member 202 is configured to more than double in height in the uppermost position as compared to the lowermost position. When the components of the movable support member 202 are fully assembled, the inner telescoping element 210 is located within the interior of the outer telescoping element 212 and the rotator member 263 is located within the interior of the inner telescoping element 212. These components are concentrically arranged in the exemplified embodiment.

As seen in these figures, the engagement members 224 of the rotator member 263 are in contact with the vertically extending protrusions 220 of the inner telescoping element so that any rotational movement of the rotator member 263 (which occurs due to its operable coupling to the gear train 218 and rack 293 via the engagement plate 261) will result in the same rotational movement of the inner telescoping element 210. Furthermore, each of the ramp elements 226 of the inner telescoping element 210 are located within the channel 239 of the follower member 229 of one of the lifting members 228. Thus, as the inner telescoping element 210 is made to rotate by the rotator member 263, the ramp elements 226 of the inner telescoping element 210 ride within the channels 239 of the follower members 229 of the lifting members 228, which causes the inner telescoping element 210 to move vertically upward. Specifically, the because the ramp elements 226 are helical such that their two ends are at different elevations, as the inner telescoping element 210 rotates it will be forced upwards so long as the ramp elements 226 are located within the channels 239 of the follower members 229 of the lifting members 228. It should be appreciated that in other embodiments the follower member 229 could comprise a feature such as a protrusion or the like that nests within a helical channel or trackin the inner surface 310 of the inner telescoping element 210 with the same effect.

Furthermore, as seen in FIG. 14 and mentioned previously above, the projections 230 of the inner telescoping element 210 are positioned within the tracks 232, and more specifically within the channels 326 of the tracks 232, of the outer telescoping element 212. The projections 230 are prevented from being removed from the channels 326 of the tracks 232 by the first and second annular flanges 329, 330. Moreover, the outer telescoping element 212 is prevented from rotating due to the interaction between the anti-rotation feature 331 of the outer telescoping element 212 and the recess 101 discussed above (not shown in FIGS. 13 and 14). As a result, as the inner telescoping element 210 rotates and moves upwardly, the projections 230 ride within the channels 326 of the tracks 232, which causes the outer telescoping element 212 to also move upwardly. Thus, each upward movement of the movable support member 202 is doubled because both of the inner and outer telescoping elements 210, 212 move upwardly at the same time. The outer telescoping element 212 does not just move because the inner telescoping element 210 moves. Rather, the outer telescoping element 212 moves vertically relative to the inner telescoping element 210 as the inner telescoping element 210 is also moving vertically. Thus, if the inner telescoping element 210 moves vertically a first distance, the outer telescoping element 210 will move vertically a second distance which is greater than the first distance.

Specifically, as the movable support member 202 moves vertically upwards, a distance between the top end 313 of the inner telescoping element 210 and the top end 323 of the outer telescoping element 212 increases because the outer telescoping element 212 is moving relative to the inner telescoping element 210. Similarly, as the movable support member 202 moves vertically downwards, the distance between the top end 313 of the inner telescoping element 210 and the top end 323 of the outer telescoping element 212 decreases because the outer telescoping element 212 is moving relative to the inner telescoping element 210.

Furthermore, it should be appreciated that by reversing the direction of the motor, the components will rotate in the opposite direction to cause the movable support member 202 (the inner and outer telescoping elements 210, 212) to move downwardly instead of upwardly. Using the interaction and components noted above, the movable support member 202 is movable from the lowermost position (FIG. 13) to the uppermost position (FIG. 14) and any position therebetween. As should be appreciated, once the actuation assembly 209 is activated so that the motor 216 (and hence also the gears of the gear train 218) is rotating, both of the inner and outer telescoping elements 210 move simultaneously either towards or away from the beverage dispensing outlet 204.

Accordingly, as the inner telescoping element 210 rotates and the projections 230 rotate, they are urged along the tracks 232. As noted above, the outer telescoping element 212 does not rotate with the inner telescoping element 210 in the exemplified embodiment. Thus, the projections 230 urge the outer telescoping element 212 vertically upwards (or downwards) as the inner telescoping element 210 rotates. Specifically, as the inner telescoping element 210 rotates clockwise, the interaction between the projections 230 and the tracks 232 forces the outer telescoping element 212 to move vertically upwards because the tracks 232 are angled downwardly in the clockwise direction. Similarly, as the inner telescoping element 210 rotates counterclockwise, the interaction between the projections 230 and the tracks 232 forces the outer telescoping element 212 to move vertically downwards because the tracks 232 are angled upwardly in the counterclockwise direction.

As both the inner and outer telescoping elements 210, 212 have respective helical ramping, this arrangement will be generally described herein as a "double-helix" configuration. The helical tracks 232 and the helical ramps 226 are angled in opposite directions. Specifically, moving clockwise within the inner and outer telescoping elements 210, 212, the helical ramps 226 are angled upwardly and the helical tracks 232 are angled downwardly. This configuration greatly increases the vertical distance that the movable support member 202 can travel with only a small angular rotation of the motor 216. Accordingly, the movable support member 202 can accommodate a large range of vessel heights. Of course, although in the exemplified embodiment the movable support member 202 is formed in the double-helix configuration described above, it should be appreciated that other configurations for adjusting the height or vertical position of a beverage vessel support are also possible.

Figure 15:
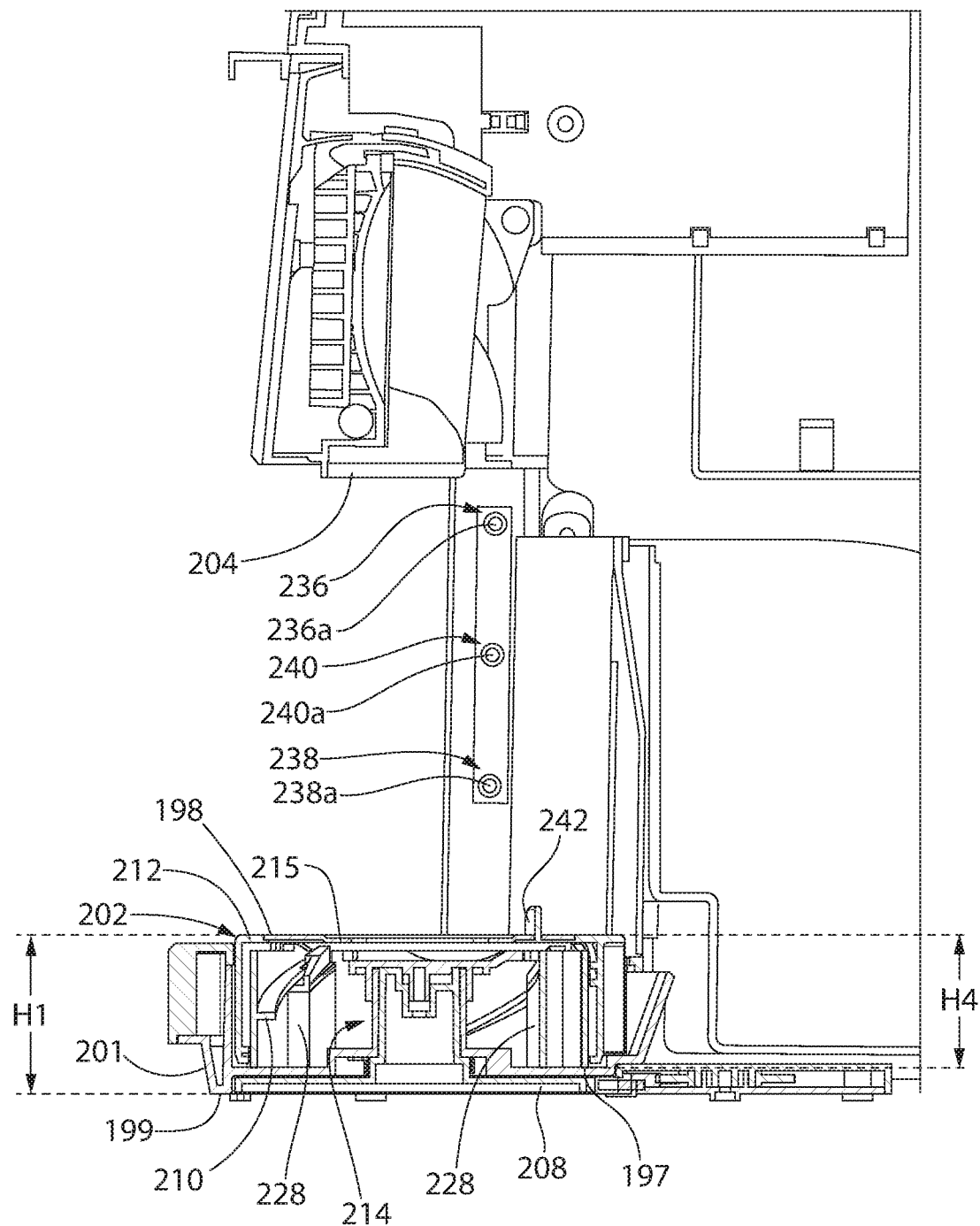
FIG. 15 is a cross-sectional view taken along line XV-XV of FIG. 2 with the movable support member of the beverage vessel support in the lowermost position.
Figure 16:
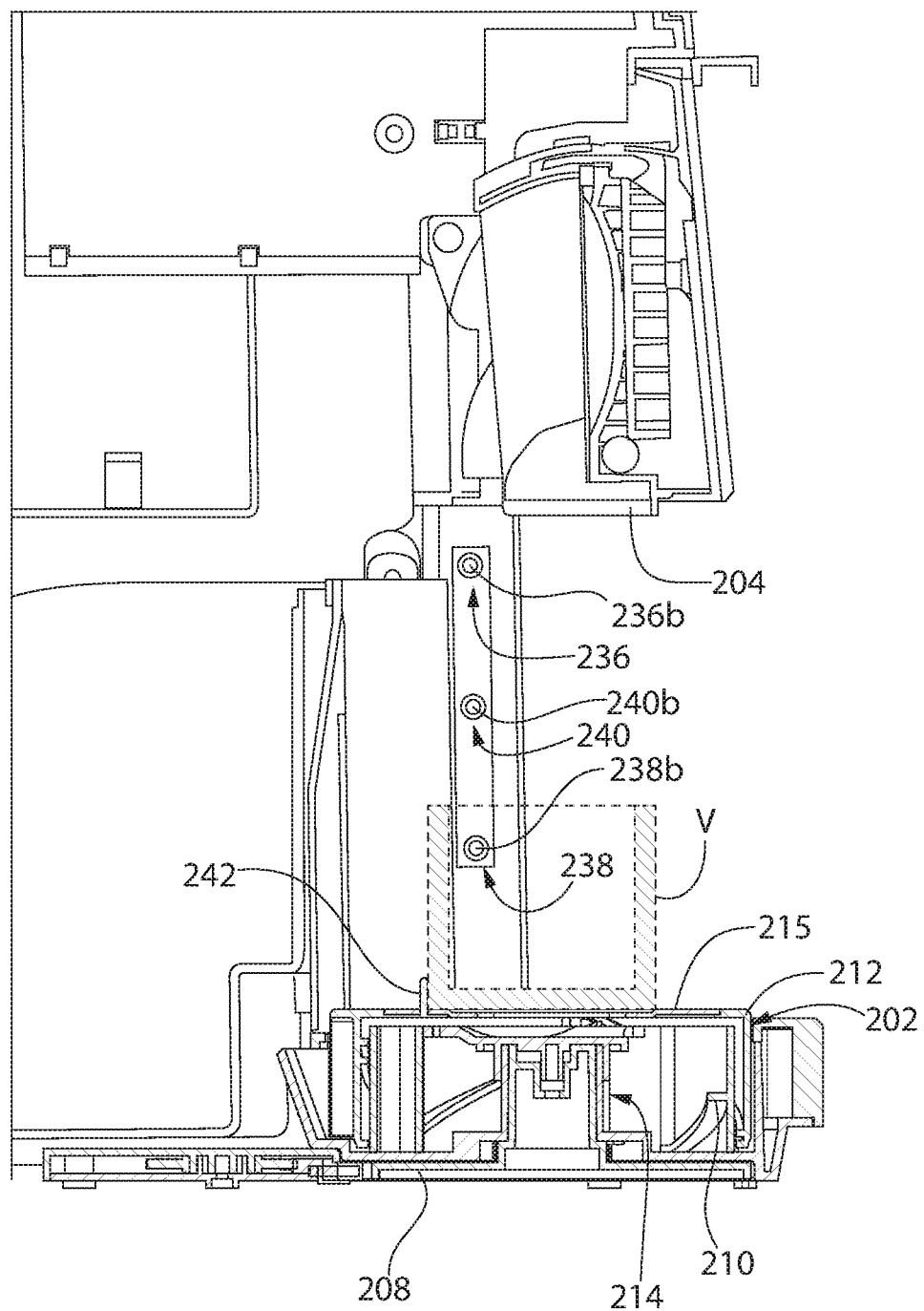
FIG. 16 is a cross-sectional view taken along line XVI-XVI of FIG. 2 with the movable support member of the beverage vessel support in the lowermost position and with a vessel positioned on the movable support member.

Referring now to FIGS. 15 and 16, the arrangement and operation of the beverage vessel support apparatus 200 will be described with reference to the full beverage dispensing apparatus 100 rather than just the movable support member 202 thereof. FIG. 15 shows a cross-sectional view of the beverage dispensing apparatus 100 as viewed on the plane shown in FIG. 2 in the directions of the arrows XV-XV. FIG. 16 shows a cross-sectional view of the beverage dispensing apparatus 100 as viewed on the plane shown in FIG. 2 in the opposing direction as shown by the arrows XVI-XVI. The description below will include a discussion of the sensor apparatus 203 and the role it plays in the overall operation of the beverage dispensing apparatus 100.

The beverage vessel support apparatus 200 comprises a height-adjustable beverage vessel support, in this case the movable support member 202 of the beverage vessel support assembly 300 described above. As discussed above, the movable support member 202 is height-adjustable such that it is configured for supporting a beverage vessel at a plurality of different support positions. In other words, the movable support member 202 can support a beverage vessel over a range of different vertical heights. The beverage vessel support apparatus 200 also comprises the actuation assembly 209 configured for adjusting a height of the movable support member 202. An exemplary actuation assembly 209 is discussed above, but other types of actuators can be envisaged. As illustrated in FIGS. 15 and 16, the movable support member 202 is arranged at its lowermost vertical position. When it is not performing a vending operation, the beverage dispensing apparatus 100 is configured to maintain the movable support member 202 at this lowermost position.

The sensor apparatus 203 of the beverage vessel support apparatus 200 comprises a beverage vessel rim detector 236 that comprises a rim emitter 236a and a rim receiver 236b configured on opposing sides of the beverage vessel support apparatus 200 at a vertical position proximate the beverage dispensing outlet 204. The beverage vessel rim detector 236 is configured to determine whether an uppermost part of a beverage vessel supported by the beverage vessel support assembly 300 is at an appropriate position for a beverage to be dispensed into the beverage vessel. In particular, the rim emitter 236a emits light, such as infrared light which, when no obstruction is present between the rim emitter 236a and the rim receiver 236b, is measured as an intensity at the rim receiver 236b. If an object is placed between the rim emitter 236a and the rim receiver 236b, then the intensity measured at the rim receiver 236b reduces, which indicates the presence of an object at the vertical position of the rim detector 236. Thus, if the rim or uppermost part of a beverage vessel breaks the line-of-sight between the rim emitter 236a and the rim receiver 236b, then this can be detected. This type of sensor emitter-receiver detector shall be referred to herein as a beam-break detector.

The beverage vessel support apparatus 200 further comprises a first beverage vessel detector 238 arranged at a low vertical position proximate the support surface of the movable support member 202. The first beverage vessel detector 238 comprises a first emitter 238a and a first receiver 238b and operates as a beam-break detector in a similar fashion to the rim detector 236 described above. The first beverage vessel detector 238 is configured to determine whether a beverage vessel is present on the beverage vessel support 202. It will be understood that, if a beverage vessel is placed on the beverage vessel support 202, then this will break the line-of-sight between the first emitter 238a and the first receiver 238b. An exemplary vessel V is illustrated in ghost-form in FIG. 16 showing how a vessel may break the line-of-sight of the first beverage vessel detector 238 and be detected.

The beverage vessel support apparatus 200 further comprises a second beverage vessel detector 240 arranged at an intermediate vertical position between the vertical positions of the beverage vessel rim detector 236 and the first beverage vessel detector 238. Like the other detectors 236, 238, the second beverage vessel detector 240 comprises a second emitter 240a and a second receiver 240b and is configured as a beam-break detector. The second beverage vessel detector 240 is also configured to determine whether a beverage vessel is present on the beverage vessel support.

Figure 18:
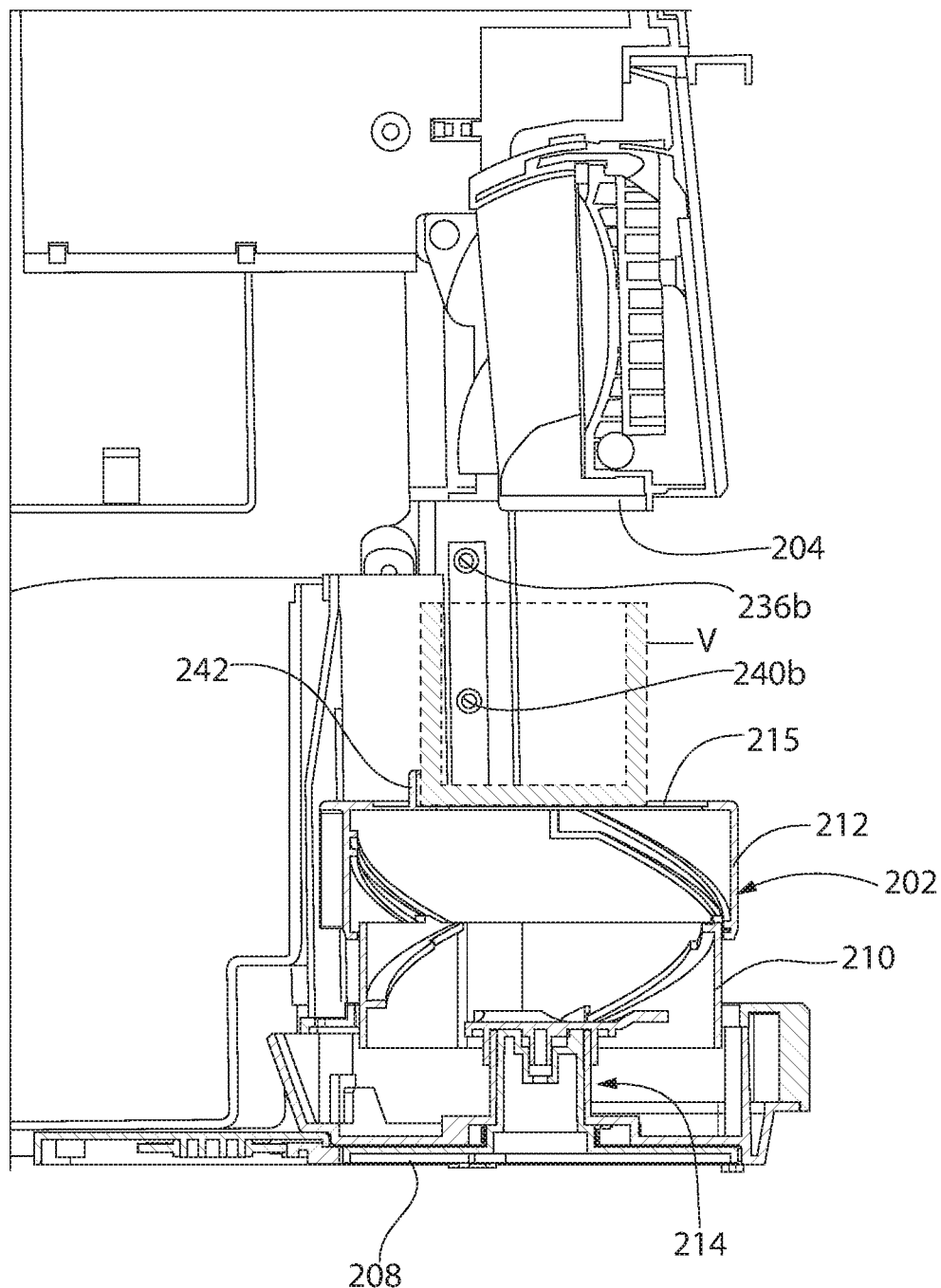
FIG. 18 is the cross-sectional view of FIG. 16 with the movable support member of the beverage vessel support in the uppermost position.

The plurality of support positions of the height-adjustable movable support member 202 comprise a lowermost support position, as illustrated in FIGS. 15 and 16, and an uppermost support position as illustrated in FIGS. 17 and 18. The movable support member 202 can also take a plurality of intermediate support positions between the lowermost and uppermost support positions shown.

As the beverage vessel support apparatus 200 defaults the movable support member 202 to the lowermost position shown in FIGS. 15 and 16 when not vending a beverage, when a user places a beverage vessel on the movable support member 20, this will always be detected by the lower first beverage vessel detector 238, provided that the vessel is of sufficient height to break the line-of-sight of the detector 238. The vertical position of the first beverage vessel detector 238 is configured such that most typical beverage vessels shall be detected. In this example, any beverage vessel of at least 50 mm in height shall be detected by the first beverage vessel detector 238. Accordingly, any vessel over this minimum height will be detected when placed upon the beverage vessel support 202 in the lowermost position. Accordingly, the second beverage vessel detector 238 is redundant at this time and is not utilised to save power.

When a vending operation is requested by a user, the beverage vessel support apparatus 200 first checks, using the first beverage vessel detector 238, that a beverage vessel has been placed on the movable support member 20. If no vessel is detected, then the user may be presented with an alert, such as a visual or audio alert that the vend is not possible as no vessel is present or too small a vessel is present. If the presence of a vessel is detected by the first beverage vessel detector 238, then the rim detector 236 is then utilized to determine whether the uppermost part or rim of the vessel is at an appropriate position for beverage to be dispensed. If the rim of the vessel is too low (or too far from the beverage dispensing outlet 204, dispensing of the beverage into the vessel could cause the beverage to splash out of the vessel creating a mess. Thus, it is typically desirable to have the rim of the vessel located at or near the rim detector 236.

If it is detected by the rim detector 236 that the rim is at the appropriate height, then the dispensing begins. However, if no rim is detected by the rim detector 236, then the motor 216 is initiated to raise the movable support member 202, as described in great detail above. For taller beverage vessels, only a small raising of the movable support member 202 may be required to cause the rim to be detected. If the rim is detected during raising of the beverage vessel support assembly 300, then the motor 216 is deactivated. However, the presence of the vessel must now be re-verified in order to avoid dispensing beverage if the vessel was removed during the raising operation. For taller vessels, movable support member 202 may not have risen above the vertical position of the first beverage vessel detector 238, in which case the vessel presence can be re-verified by the same detector. However, for smaller beverage vessels, the beverage vessel support may have risen above the first beverage vessel detector 238.

FIGS. 17 and 18, show the scenario in which the movable support member 202 has risen above the vertical position of the first beverage vessel detector 238. In such a situation, the first beverage vessel detector 238 is no longer able to determine whether a vessel is still present on the beverage vessel support assembly 300, as it is now blocked by the movable support member 202. In this particular configuration, as shown in FIG. 18, the vessel V is actually too short to be detected by the rim detector 236 and thus the movable support member 202 has risen to its uppermost vertical limit position. The range of positions of the movable support member 202 below the first beverage vessel detector 238 may be known as a lower portion of the positions, and the range of positions of the movable support member 202 above the detector 238 may be known as an upper portion of the positions. The vertical position of the first beverage vessel detector 238 may be known as a cross-over position, for reasons which will become apparent below.

An encoder or similar may be provided (not shown) in order to determine the height or vertical position of the movable support member 202. If it is determined that, after stopping the raising of the movable support member 202 due to rim detection or reaching the uppermost limit position, the movable support member 202 is above the cross-over position where the first beverage vessel detector 238 is blocked, then it is determined that the second beverage vessel detector 240 must now be used. The uppermost support position of the movable support member 202 is below the vertical position of the second beverage vessel detector 240, so the detector 240 may always be used to detect the presence of a vessel at all positions of the beverage vessel support assembly 300.

Thus, the beverage vessel support apparatus 200 is configured such that when the movable support member 202 is at a support position below the vertical position of the first beverage vessel detector 238 (a.k.a. the crossover position), the first beverage vessel detector 238 is used to detect the presence of a beverage vessel before dispensing beverage, and when the movable support member 202 is at a support position above the vertical position of the first beverage vessel detector 238, then the second beverage vessel detector 240 is used to detect the presence of a beverage vessel before dispensing beverage. A controller may be provided to carry out the method of operation of the beverage dispensing apparatus, and in particular the beverage vessel support apparatus 200, described herein.

Accordingly, using the beverage vessel support apparatus 200 according to the present disclosure may provide a beverage vessel support apparatus 200 for a beverage dispensing apparatus 100 which can accommodate or permit the use of a greater range of beverage vessel sizes with automatic and safe operation. In particular, in order to provide automatic operation and beverage vessel positioning for vessels over a large range of vessel heights, a greater range of vertical movement of the movable support member 202 of the beverage vessel support assembly 300 must be provided. However, this may mean that, at the higher elevations of the support required for small vessels, the movable support member 202 may block a beverage vessel sensor or otherwise inhibit its operation to detect the presence of a vessel. Accordingly, by providing a further beverage vessel detector at a higher vertical position, the presence of the vessel can still be verified during a vending operation to prevent vending if a vessel is removed during a vending operation. Furthermore, the aspects may allow for the use of very small vessels where the vessel rim would not reach the rim detector even in the highest support position, as the further beverage vessel detector may verify the presence of a vessel when the rim detector and lower vessel detector may be incapable. In addition, as the movable support member 202 may block the first beverage vessel detector, the movable support member 202 may be used also be used to test that the beverage vessel support actuator is operating correctly, as the detector should give a positive after a predetermined operation of the actuator, such as a fixed number of motor revolutions.

Referring to FIG. 15, the movable support member 202 may have a first height H1 measured from a bottom surface 199 of the base member 201 to a top surface 198 of the movable support member 202 when the movable support member 202 is in its lowermost position. Furthermore, referring to FIG. 17, the movable support member 202 may have a second height H2 measured from the bottom surface 199 of the base member 201 to the top surface 198 of the movable support member 202 when the movable support member 202 is in its uppermost position. In some embodiments, the second height H2 may be at least twice the first height H1. In other embodiments, the second height H2 may be more than twice the first height H1. Thus, a ratio of H2:H1 may be at least 2:1, or in other embodiments at least 2.1:1. In some embodiments, the first height H1 may be between 42 mm and 52 mm, and more specifically 45 mm an d 50 mm, and H2 may be between 95 mm and 105 mm, and more specifically between 98 mm and 102 mm.

Furthermore, in the lowermost position, the movable support member 202 has a third height H3 measured from a bottom surface 197 thereof to the top surface 198 thereof. In the uppermost position, the movable support member 202 has a fourth height H4 measured from the bottom surface 197 thereof to the top surface 198 thereof. Thus, a ratio of the third height H3 to the fourth height H4 may be at least 1.5:1 in some embodiments, or at least 1.6:1 in other embodiments, or at least 1.7:1 in still other embodiments. In some embodiments, the third height H3 may be between 63 mm and 73 mm, and more specifically between 65 mm and 70 mm, and the fourth height may be between 35 mm and 45 mm, and more specifically between 38 mm and 42 mm.

The beverage vessel support apparatus 200 further comprises a beverage vessel positioning element 242, which defines a preferred position for a beverage vessel on the movable support member 202. The beverage vessel rim detector 236, and the first and second beverage vessel detectors 238, 240 may be configured or positioned to coincide substantially or approximately with a tangent of a beverage vessel having a circular cross-section, optionally a straight-sided cylindrical beverage vessel, when positioned in the preferred position. This may improve the detection of vessels which are transparent or translucent, as a thickest part of the vessel may be present between the detector emitters and receivers.

Thus, using the components described herein, the movable support member 202 can be height-adjusted so that its top surface 198 can be positioned at different elevations relative to a horizontal support surface on which the beverage dispensing apparatus 100 is positioned (such as a countertop or the like). Stated another way, the movable support member 202 can be height-adjusted so that its top surface 198 is located at varying distances below the beverage dispensing outlet 204. As seen in FIGS. 15 and 17, movement of the movable support member 202 modifies a distance between the top surface 198 of the movable support member 202 and the beverage dispensing outlet 204. Thus, in the lowermost position of FIG. 15 the top surface 198 of the movable support member 202 is located a greater distance away from the beverage dispensing outlet 204 than in the uppermost position of FIG. 17. The top surface 198 of the movable support member 202 can be located at any position between the lowermost position of FIG. 15 and the uppermost position of FIG. 17 and thus the distance between the top surface 198 of the movable support member 202 and the beverage dispensing outlet 204 can be any distance between and including the distance shown in FIG. 15 and the distance shown in FIG. 17.

It will be understood that the invention is not limited to the embodiments above described and various modifications and improvements can be made without departing from the concepts described herein. Except where mutually exclusive, any of the features may be employed separately or in combination with any other features and the disclosure extends to and includes all combinations and sub-combinations of one or more features described herein.

What is claimed is:

1. A beverage dispensing apparatus comprising:
a beverage dispensing outlet for dispensing a beverage;
a movable support member having a top surface for supporting a beverage vessel below the beverage dispensing outlet, the movable support member comprising an inner telescoping element and an outer telescoping element;
an actuation assembly operably coupled to the movable support member and configured to move the movable support member to modify a distance between the top surface of the movable support member and the beverage dispensing outlet; and
wherein activation of the actuation assembly causes both the inner and outer telescoping elements to move simultaneously either towards or away from the beverage dispensing outlet; and
wherein as the movable support member moves towards or away from the beverage dispensing outlet, the outer telescoping element moves vertically relative to the inner telescoping element.

2. The beverage dispensing apparatus according to claim 1 wherein the movable support member is movable between a plurality of support positions, wherein the distance between the top surface of the movable support member and the beverage dispensing outlet is different in each of the plurality of support positions, and wherein the inner telescoping element is at least partially surrounded by the outer telescoping element in all of the plurality of support positions.

3. The beverage dispensing apparatus according to claim 1 wherein the beverage dispensing outlet is non-movable.

4. The beverage dispensing apparatus according to claim 1 wherein the outer telescoping element comprises the top surface of the movable support member.

5. The beverage dispensing apparatus according to claim 1 wherein the inner telescoping element rotates about an axis as it moves towards and away from the beverage dispensing outlet, and wherein the outer telescoping element is prevented from rotating as it moves towards and away from the beverage dispensing outlet.

6. The beverage dispensing apparatus according to claim 1 further comprising a rotator assembly operably coupled to the actuation assembly and to the movable support member, wherein activation of the actuation assembly causes the rotator assembly to rotate about a rotational axis, and wherein rotation of the rotator assembly in a first rotational direction causes the inner and outer telescoping elements to move towards the beverage dispensing outlet to decrease the distance between the top surface of the movable support member and the beverage dispensing outlet, and wherein rotation of the rotator assembly in a second rotational direction that is opposite the first rotational direction causes the inner and outer telescoping elements to move away from the beverage dispensing outlet to increase the distance between the top surface of the movable support member and the beverage dispensing outlet.

7. The beverage dispensing apparatus according to claim 1 further comprising a rotator assembly operably coupled to the actuation assembly and to the movable support member, wherein the rotator assembly comprises an engagement plate that is coupled to the actuation assembly and a rotator member comprising at least one engagement member that is coupled to a vertically extending protrusion of the inner telescoping element, and wherein activation of the actuation assembly causes the rotator member and the inner telescoping element to rotate, wherein during rotation of the rotator member and the inner telescoping element, the inner telescoping element moves vertically relative to the rotator member.

8. The beverage dispensing apparatus according to claim 1 wherein activation of the actuation assembly causes the inner telescoping element to rotate about a central axis, and wherein the inner telescoping element comprises at least one helical ramp element, and further comprising a stationary lifting member in operable engagement with the helical ramp element so that as the inner telescoping element rotates about the central axis the inner telescoping element moves either towards or away from the beverage dispensing outlet, wherein the inner telescoping element further comprises a projection that rides along a helical track of the outer telescoping element to move the outer telescoping element towards or away from the beverage dispensing outlet in tandem with the inner telescoping element.

9. The beverage dispensing apparatus according to claim 1 wherein the actuation assembly comprises a motor, a driver gear operably coupled to the motor, a driven gear operably coupled to the driver gear, and a rack gear operably coupled to the driven gear, wherein the rack gear is operably coupled to a rotator assembly so that activation of the motor causes the rotator assembly to rotate, and wherein the rotator assembly is operably coupled to the inner telescoping element so that rotation of the rotator assembly causes the inner telescoping element to rotate and move vertically either towards or away from the beverage dispensing outlet.

10. The beverage dispensing apparatus according to claim 1 further comprising a base member comprising a base component having a cavity with an open top end and a cover closing the open top end of the cavity, a plurality of drainage apertures in the cover to permit liquid to flow through the cover and into the cavity of the base component, and wherein the movable support member is positioned in the cavity of the base member and protrudes through an opening in the cover.

11. The beverage dispensing apparatus according to claim 10 further comprising:
a beverage vessel support assembly comprising:
a support component that comprises the base member and the movable support member; and an actuation component that comprises the actuation assembly; and wherein the support component is detachably coupled to the actuation component.

12. A beverage dispensing apparatus comprising:
a housing extending from a bottom end to a top end along a longitudinal axis;
a beverage dispensing outlet for dispensing a beverage;
a movable support member for supporting a beverage vessel below the beverage dispensing outlet, the movable support member comprising a first component and a second component; and
an actuation assembly operably coupled to the movable support member so that upon activation of the actuation assembly the first component moves relative to the housing in one of a first vertical direction and a second vertical direction parallel to the longitudinal axis of the housing and the second component simultaneously moves relative to the first component in the same one of the first and second vertical directions.

13. The beverage dispensing apparatus according to claim 12 wherein the first component rotates in a first rotational direction as it moves in the first vertical direction and in a second rotational direction that is opposite the first rotational direction as it moves in the second vertical direction, and wherein the second component is prevented from rotating as it moves in the first and second vertical directions.

14. The beverage dispensing apparatus according to claim 12 wherein the actuation assembly is operably coupled to the first component to rotate the first component about an axis, the first component comprising at least one helical ramp element, and further comprising a stationary lifting member in operable engagement with the at least one helical ramp element so that as the first component rotates about the axis the engagement between the stationary lifting member and the at least one helical ramp element forces the first component to move in one of the first and second vertical directions, wherein the first component further comprises a projection that rides along a helical track of the second component to move the second component in the same vertical direction as the first component.

15. The beverage dispensing apparatus according to claim 14 wherein the helical ramp element of the first component comprises a first end that is adjacent to a bottom end of the first component and a second end that is adjacent to a top end of the first component and the helical track of the second component comprises a first end that is adjacent to a bottom end of the second component and a second end that is adjacent to a top end of the second component, the helical ramp element extending from the first end to the second end in a first rotational direction and the helical track extending from the first end to the second end in a second rotational direction that is opposite the first rotational direction.

16. A beverage dispensing apparatus comprising:
a housing;
a beverage vessel support assembly comprising a support component that is detachably coupled to the housing, the support component comprising:
a base member comprising a cavity, a top surface, and an opening in the top surface; and
a movable support member at least partially positioned within the cavity of the base member; and
an actuation assembly operably coupled to the movable support member and configured to move the movable support member relative to the base member between a plurality of support positions, wherein the movable support member extends through the opening in the base member and protrudes from the top surface of the base member in at least some of the plurality of support positions; and
wherein the beverage vessel support assembly comprises an actuation component that is coupled to the housing, the actuation component comprising the actuation assembly, and wherein the support component is detachably coupled to the actuation component, wherein the actuation component comprises a plate member having a top surface and a bottom surface, the actuation assembly comprising a motor positioned on the top surface of the plate member and a gear train positioned on the bottom surface of the plate member, wherein the gear train is operably coupled to an engagement plate of a rotator assembly, the rotator assembly further comprising a rotator member that is coupled to the movable support member to rotate at least a portion of the movable support member when the actuation assembly is activated.

17. The beverage dispensing apparatus according to claim 16 wherein the movable support member comprises a top surface that is configured to support a beverage vessel, and wherein the top surface of the movable support member is elevated above the top surface of the base member in all of the plurality of support positions.

18. The beverage dispensing apparatus according to claim 16 wherein the actuation assembly is configured to rotate at least a portion of the movable support member, and wherein the base member further comprises a stationary lifting element that is operably coupled to the portion of the movable support member to move the movable support member vertically relative to the base member as the portion of the movable support member rotates, wherein the stationary lifting element interacts with a helical ramp element on the portion of the movable support member to move the movable support member vertically relative to the base member.

19. The beverage dispensing apparatus according to claim 16 wherein the movable support member comprises a first component and a second component, and wherein activation of the actuation assembly causes the first component to rotate and move vertically relative to the base member and causes the second component to move vertically relative to the first component, wherein the second component comprises an anti-rotation feature that interacts with an anti-rotation feature of the housing to prevent the second component from rotating as it moves vertically relative to the first component.

* * * * *